United States Patent
Maeda et al.

(10) Patent No.: US 12,244,607 B2
(45) Date of Patent: Mar. 4, 2025

(54) SELECTION METHOD, SELECTION SYSTEM, AND RECORDING MEDIUM

(71) Applicant: Panasonic Intellectual Property Corporation of America, Torrance, CA (US)

(72) Inventors: Manabu Maeda, Osaka (JP); Daisuke Kunimune, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 379 days.

(21) Appl. No.: 17/840,224

(22) Filed: Jun. 14, 2022

(65) Prior Publication Data

US 2022/0311781 A1    Sep. 29, 2022

Related U.S. Application Data

(63) Continuation of application No. PCT/JP2020/046435, filed on Dec. 11, 2020.

(30) Foreign Application Priority Data

Dec. 23, 2019 (JP) .................. 2019-231730

(51) Int. Cl.
H04L 9/40 (2022.01)
B60R 16/023 (2006.01)
H04L 67/12 (2022.01)

(52) U.S. Cl.
CPC .......... *H04L 63/123* (2013.01); *B60R 16/023* (2013.01); *H04L 63/126* (2013.01);
(Continued)

(58) Field of Classification Search
CPC ....... H04L 63/1408–1425; H04L 63/20; H04L 63/0263
See application file for complete search history.

(56) References Cited

U.S. PATENT DOCUMENTS

2006/0083264 A1* 4/2006 Jordan .................. H04L 12/403
370/503
2015/0358351 A1 12/2015 Otsuka et al.
(Continued)

FOREIGN PATENT DOCUMENTS

JP    2018-182725    11/2018
JP    2019-83534    5/2019

OTHER PUBLICATIONS

Song et al. "Intrusion Detection System Based on the Analysis of Time Intervals of CAN Messages for In-Vehicle Network" [Online], Mar. 10, 2016 [Retrieved on: Aug. 21, 2024], www.ieee.org , Retrieved from: < https://ieeexplore.ieee.org/stamp/stamp.jsp?tp=&arnumber=7427089 > (Year: 2016).*

(Continued)

*Primary Examiner* — Eric W Shepperd

(74) *Attorney, Agent, or Firm* — Greenblum & Bernstein, P.L.C.

(57) ABSTRACT

A selection method is for selecting a reference message to be used to detect unauthorized communication in an in-vehicle network system including a network and one or more electronic control units connected to the network. The reference message is used as a reference for determining whether a message sent to the network is anomalous. The selection method includes: storing candidate information regarding one or more reference message candidates each being a candidate of the reference message; selecting, based on the candidate information regarding the one or more reference message candidates stored in the storing, the selection method for selecting the reference message from among the one or more reference message candidates; and selecting the reference message from among the one or more reference message candidates using the selection method.

11 Claims, 21 Drawing Sheets

(52) U.S. Cl.
CPC ...... *H04L 63/1416* (2013.01); *H04L 63/1425* (2013.01); *H04L 67/12* (2013.01)

(56) References Cited

U.S. PATENT DOCUMENTS

| | | | |
|---|---|---|---|
| 2018/0314571 A1* | 11/2018 | Tanabe | H04L 63/1425 |
| 2019/0141070 A1* | 5/2019 | Tsurumi | B60R 16/0232 |
| 2019/0149561 A1 | 5/2019 | Maeda et al. | |
| 2019/0149562 A1 | 5/2019 | Maeda et al. | |
| 2020/0213340 A1* | 7/2020 | Hamada | H04L 12/40032 |
| 2021/0377074 A1* | 12/2021 | Yoshida | H04L 12/40104 |
| 2021/0392109 A1* | 12/2021 | Hamada | H04L 63/1425 |
| 2022/0279005 A1* | 9/2022 | Torisaki | H04L 63/1425 |
| 2022/0303305 A1* | 9/2022 | Shin | H04L 41/065 |

OTHER PUBLICATIONS

Mar. 16, 2021 International Search Report issued in corresponding International Pat. Appl. No. PCT/JP2020/046435, along with an English translation thereof.

* cited by examiner

FIG. 4

| Receiving ID list |
|---|
| 1 |
| 2 |
| 3 |
| 4 |

FIG. 5

| Source | Destination | ID |
|---|---|---|
| 200a | 200b | * |
| 200b | 200a | 3 |

SELECTION METHOD, SELECTION SYSTEM, AND RECORDING MEDIUM

CROSS REFERENCE TO RELATED APPLICATIONS

This is a continuation application of PCT International Application No. PCT/JP2020/046435 filed on Dec. 11, 2020, designating the United States of America, which is based on and claims priority of Japanese Patent Application No. 2019-231730 filed on Dec. 23, 2019. The entire disclosures of the above-identified applications, including the specifications, drawings and claims are incorporated herein by reference in their entirety.

FIELD

The present disclosure relates to, for example, a selection method for selecting a reference message to be used to detect unauthorized communication in a network system.

BACKGROUND

Recent years have seen a large number of devices called electronic control units (hereinafter also referred to as ECUs) installed in automotive interior systems. A network connecting these ECUs is called an in-vehicle network. There are numerous communication standards for the in-vehicle network. Among these, one of the most dominant in-vehicle network standards is a controller area network (hereinafter also referred to as a CAN).

In a network compliant with the CAN standard (hereinafter also referred to as a CAN network), a communication path (bus) is composed of two cables, and an ECU connected to the bus is also referred to as a node. Each node connected to the bus transmits and receives data in units of so-called frames or messages. In the CAN, an identifier indicating a data source or destination is not used. A node that transmits a frame (hereinafter also referred to as a transmitting node) attaches, to each message, ID called a message ID, which indicates the type of the message, and transmits the message, in other words, sends a signal to the bus. A node that receives a message (hereinafter also referred to a receiving node) receives only a message including a predetermined message ID, in other words, reads the signal from the bus. Messages including the same ID are transmitted at predetermined regular intervals.

As mentioned above, the large number of ECUs installed in the automotive interior systems are connected to the CAN network and exchange various messages therebetween during operation. There is a risk that an ECU having a function of communicating with an element external to the CAN network may be impersonated as a result of, for example, an attack from outside, and transmit an unauthorized message (also referred to as an anomalous message) to the CAN network. Such an impersonated ECU (also referred to as an anomalous ECU) can impersonate another ECU, transmit an anomalous message, and thereby control an automobile without authorization, for example. A method for detecting a so-called spoofing attack such as that just mentioned is disclosed in Patent Literature (PTL) 1, for example.

CITATION LIST

Patent Literature

PTL 1: International Publication No. WO2014/115455

SUMMARY

Technical Problem

However, a problem with the method disclosed in PTL 1, with which it is possible to only detect a spoofing attack that is currently occurring, is that it is not possible to judge which messages is anomalous. Possible solutions to this problem include a method for selecting a reference message to be used to judge whether the message is anomalous, and individually judging, on the basis of the selected reference message, whether the message is anomalous. In this case, it is desirable that the reference message be appropriately set.

Thus, the present disclosure is conceived to solve the aforementioned problem and provides, for example, a reference message selection method for appropriately selecting a reference message to be used to determine whether each message sent to a network is anomalous.

Solution to Problem

In order to solve the aforementioned problem, according to an exemplary embodiment disclosed herein, a selection method for selecting a reference message to be used to detect unauthorized communication in an in-vehicle network system including a network and one or more electronic control units connected to the network, the reference message being used as a reference for determining whether a message sent to the network is anomalous, includes: storing candidate information regarding one or more reference message candidates each being a candidate of the reference message; firstly selecting, based on the candidate information regarding the one or more reference message candidates stored in the storing, the selection method for selecting the reference message from among the one or more reference message candidates; and secondly selecting the reference message from among the one or more reference message candidates using the selection method selected in the firstly selecting.

Furthermore, according to an exemplary embodiment disclosed herein, a selection system for selecting a reference message to be used to detect unauthorized communication in an in-vehicle network system including a network and one or more electronic control units connected to the network includes: one or more processors; and storage. The reference message is used as a reference for determining whether a message sent to the network is anomalous. The one or more processors perform the following using the storage: storing candidate information regarding one or more reference message candidates each being a candidate of the reference message; selecting, based on the candidate information regarding the one or more reference message candidates stored, a selection method for selecting the reference message from among the one or more reference message candidates; and selecting the reference message from among the one or more reference message candidates using the selection method.

Furthermore, according to an exemplary embodiment disclosed herein, a non-transitory computer-readable recording medium has recorded thereon a program for causing a computer to execute the above-described selection method.

Note that these general or specific aspects may be implemented using a system, a device, a method, an integrated circuit, a computer program, or a non-transitory computer-readable recording medium such as a compact disc read-only memory (CD-ROM), or any combination of systems, devices, methods, integrated circuits, computer programs, and recording media.

Advantageous Effects

With the selection method, etc., according to one aspect of the present disclosure, it is possible to appropriately select a reference message to be used to determine whether each message sent to a network is anomalous.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a diagram illustrating one example of the data configuration of a receiving ID list according to Embodiment 1.

FIG. 5 is a diagram illustrating one example of the data configuration of a transfer rule held in a gateway according to Embodiment 1.

DESCRIPTION OF EMBODIMENTS

Figure 1:
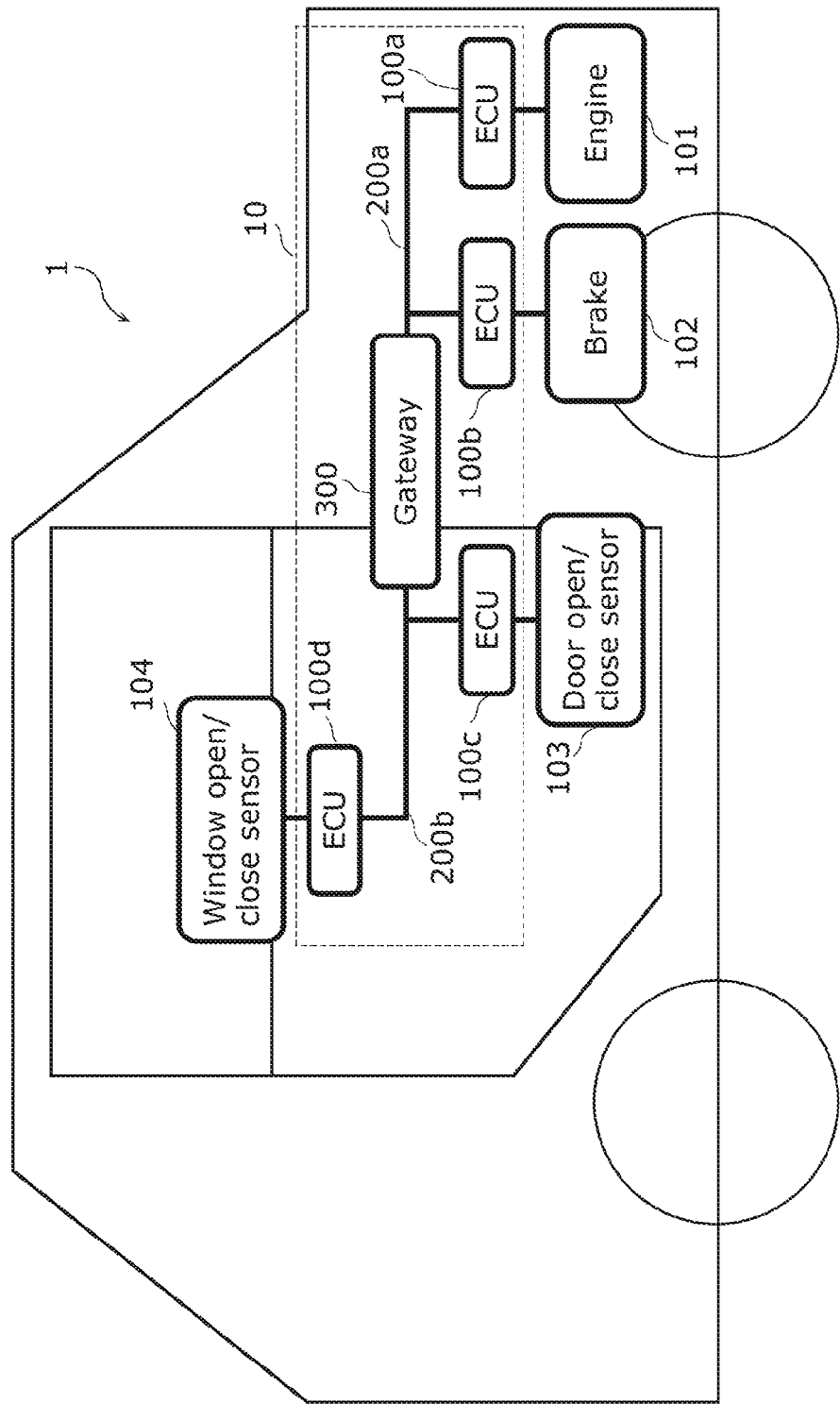
FIG. 1 is a block diagram illustrating the overall configuration of an in-vehicle network system according to Embodiment 1.

Underlying Knowledge Forming Basis of the Present Disclosure

When an anomalous ECU begins transmitting an anomalous message, a normal message and an anomalous message are mixed in messages having the same ID in a CAN network. In such a situation, as a result of the timing of transmitting a normal message and the timing of transmitting an anomalous message becoming very close to each other or being intentionally brought close to each other by an attacker, the timing of transmitting an anomalous message may also be within tolerance (the difference between the timing of transmitting an anomalous message and the predicted timing of transmitting a normal message may be within tolerance). In such a case, it is difficult to distinguish between a normal message and an anomalous message, increasing the likelihood of false detection. The same may happen to a data value included in a message besides the timing of transmitting a message. In the case where a reference message to be used to judge whether a message is anomalous is selected on the basis of such normal and anomalous messages within tolerance, it is desirable that the reference message be appropriately set. For example, among the normal and anomalous messages, the normal message is desirably set to the reference message.

According to an exemplary embodiment disclosed herein, a selection method for selecting a reference message to be used to detect unauthorized communication in an in-vehicle network system including a network and one or more electronic control units connected to the network, the reference message being used as a reference for determining whether a message sent to the network is anomalous, includes: storing candidate information regarding one or more reference message candidates each being a candidate of the reference message; firstly selecting, based on the candidate information regarding the one or more reference message candidates stored in the storing, the selection method for selecting the reference message from among the one or more reference message candidates; and secondly selecting the reference message from among the one or more reference message candidates using the selection method selected in the firstly selecting.

In this way, a selection method corresponding to one or more reference message candidates is selected; therefore, for example, if the one or more reference message candidates include an anomalous message, it is possible to keep the anomalous message from being set to the reference message. Thus, a more appropriate reference message can be selected. Furthermore, for example, compared to when the selection method for selecting a reference message is fixed, a more appropriate reference message can be selected.

For example, the firstly selecting may include, for each of a plurality of selection methods for selecting the reference message, calculating a degree of appropriateness, and selecting the selection method based on the degree of appropriateness calculated, the degree of appropriateness indicating a level of appropriateness of selecting the reference message from among the one or more reference message candidates using the selection method.

With this, a selection method for selecting a reference message can be appropriately selected on the basis of the degree of appropriateness.

For example, the firstly selecting may include selecting, as the selection method for selecting the reference message from among the one or more reference message candidates, a selection method that is highest in the degree of appropriateness among the plurality of selection methods.

With this, a selection method for selecting a reference message can be more appropriately selected on the basis of the degree of appropriateness.

For example, the degree of appropriateness may be a second difference that indicates a difference between at least two first differences, and each of the at least two first differences may indicate a difference between a predicted value for the message sent to the network and a value indicated in one of the one or more reference message candidates.

When the reference message candidates include a normal message and an anomalous message, the first difference in the normal message and the first difference in the anomalous message can be significantly different from each other. This means that when the reference message candidates include an anomalous message, the second difference can be great.

In this way, among the reference message candidates including a normal message and an anomalous message, the normal message can be selected as the reference message, as a result of selecting, as a selection method for selecting a reference message, a selection method in which the second difference is great; therefore, the reference message can be more appropriately selected.

For example, the firstly selecting may include extracting two values close to the predicted value from among three or more values indicated by three or more reference message candidates when the one or more reference message candidates include three or more reference message candidates, and the at least two first differences are differences between the predicted value and each of the two values extracted.

In this way, a selection method can be selected on the basis of two values close to the predicted value, in other words, two values considered to be suitable for the reference message; therefore, it is possible to select a selection method that is more suitably used to select the reference message.

For example, the predicted value may be calculated based on a value indicated in the reference message that has been previously selected.

In this way, the predicted value can be calculated using the value indicated in the previous reference message; therefore, it is possible to reduce the amount of processing for calculating the predicted value.

For example, the predicted value may be obtained by inputting, to a predictive model created in advance, a value indicated in one of the one or more reference message candidates that have a same ID.

In this way, it is possible to easily calculate the predicted value using the predictive model.

For example, the selection method may include at least one of: a period determination method for selecting the reference message based on a period in which the message is sent to the network; and a data determination method for selecting the reference message based on a value of data included in the message sent to the network.

In this way, it is possible to select the reference message using the determination type that is either the data value or the period that is an index generally used in a network.

For example, the selection method may include determining whether the message sent to the network is anomalous. The one or more reference message candidates may include the message determined as being anomalous in the determining. The secondly selecting may include selecting, as the reference message, a message different from the message determined as being anomalous among the one or more reference message candidates.

In this way, when an anomalous message is included, it is possible to keep the anomalous message from being selected as the reference message. This means that the reference message can be still more appropriately selected.

For example, the selection method may include determining whether the message sent to the network is anomalous. The secondly selecting may include selecting one or more messages determined as being normal in a current reception period as the one or more reference message candidates that are used in a next reception period, before the next reception period.

In this way, the reference message for the next reception period is selected within the current reception period; therefore, it is possible to delete the reference message candidates other than the selected reference message within the current reception period. This enables a reduction in the capacity of a storage device included in a device that performs the selection method for selecting a reference message.

Furthermore, according to an exemplary embodiment disclosed herein, a selection system for selecting a reference message to be used to detect unauthorized communication in an in-vehicle network system including a network and one or more electronic control units connected to the network includes: one or more processors; and storage. The reference message is used as a reference for determining whether a message sent to the network is anomalous. The one or more processors perform the following using the storage: storing candidate information regarding one or more reference message candidates each being a candidate of the reference message; selecting, based on the candidate information regarding the one or more reference message candidates stored, a selection method for selecting the reference message from among the one or more reference message candidates; and selecting the reference message from among the one or more reference message candidates using the selection method. Furthermore, according to an exemplary embodiment disclosed herein, a non-transitory computer-readable recording medium has recorded thereon a program for causing a computer to execute the above-described method for selecting a reference message.

This produces substantially the same advantageous effects as those produced by the above-described method for selecting a reference message.

Hereinafter, embodiments will be specifically described with reference to the drawings.

Note that each embodiment described below shows a general or specific example. Specifically, the numerical values, structural elements, the arrangement and connection of the structural elements, steps, the processing order of the steps, etc., shown in the following embodiments are mere examples of the present disclosure, and therefore do not limit the present disclosure. The present disclosure is defined based on the recitations of the Claims. Therefore, among the structural elements in the following embodiments, structural elements not recited in any one of the independent claims which indicate the broadest concepts of the present disclosure are not necessarily required to achieve the object of the present disclosure, but are described as structural elements of a more preferable embodiment.

Embodiment 1

[1. Outline]

With reference to the drawings, Embodiment 1 is exemplified as an in-vehicle network system in which whether a message being transmitted is anomalous is determined.

[1.1 Overall Configuration of In-Vehicle Network System]

FIG. 1 is a block diagram illustrating the overall configuration of in-vehicle network system 10 according to the present embodiment. In-vehicle network system 10 is installed in vehicle 1, for example.

In-vehicle network system 10 has a CAN network and includes: an ECU (that is ECU 100a, ECU 100b, ECU 100c, and ECU 100d in this figure; hereinafter, these will also be collectively referred to as ECU 100 or an unspecified portion of these will also be referred to as ECU 100); a bus (that is bus 200a and bus 200b in this figure; hereinafter, these will also be collectively referred to as bus 200 or an unspecified one of these will also be referred to as bus 200); and gateway 300.

ECU 100a is connected to engine 101, ECU 100b is connected to brake 102, ECU 100c is connected to door open/close sensor 103, and ECU 100d is connected to window open/close sensor 104. ECU 100 obtains the status of a device to which ECU 100 is connected, and periodically sends the message indicating the obtained status to bus 200. For example, ECU 100a obtains the number of revolutions which is one of the statuses of engine 101, attaches predetermined ID to a message including a data value indicating the number of revolutions, and sends the message to bus 200. Furthermore, each ECU 100 reads, from bus 200, the message transmitted by another ECU 100 and selectively receives the message depending on the ID attached thereto. This selective reception will be described later.

Gateway 300 connects bus 200a to which ECU 100a and ECU 100b are connected and bus 200b to which ECU 100c and ECU 100d are connected. Gateway 300 has a function of transferring the message received from one bus to the other bus. Gateway 300 is also one node in the CAN network.

Note that in-vehicle network system 10 is an example cited for the sake of explanation of a subject to which an unauthorized communication detection reference selection system (for example, a reference message selection system) or the like which selects whether a message is anomalous can be applied; this application subject is not limited to in-vehicle network system 10.

[1.2 Data Format of Message]

Figure 2:
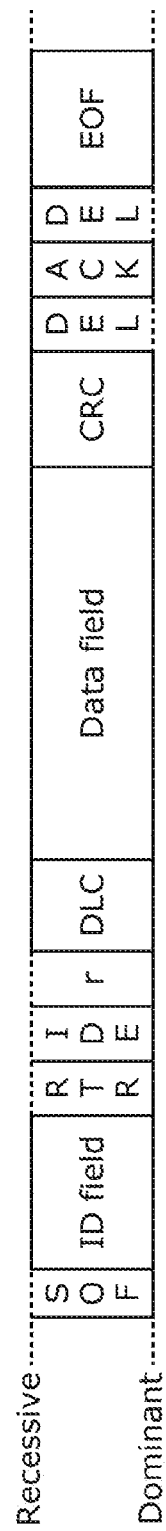
FIG. 2 is a diagram illustrating the data frame format of a CAN protocol.

FIG. 2 is a diagram illustrating the data frame format (message format) of a CAN protocol. Here, a message in the standard ID format in the CAN protocol is illustrated.

The message includes a start-of-frame (also referred to as SOF in the figure and the following description), an ID field, a remote transmission request (also referred to as RTR in the figure and the following description), an identifier extension (also referred to as IDE in the figure and the following description), a reserved bit (also referred to as r in the figure and the following description), a data length code (also referred to as DLC in the figure and the following description), a data field, a cyclic redundancy check (also referred to as CRC in the figure and the following description) sequence, a CRC delimiter (also referred to as DEL on the left-hand side in the figure), an acknowledgement (also referred to as ACK in the figure and the following description) slot, an ACK delimiter (DEL on the right-hand side in the figure), and an end-of-frame (also referred to as EOF in the figure and the following description).

The SOF is a 1-bit dominant. The dominant (meaning superiority) represents the state where a voltage is applied to two cables constituting a bus so as to transmit the value "0" in a CAN network that uses a digital scheme to transmit data, or represents the value "0" itself that is transmitted. In contrast, the state where a voltage is applied to two cables constituting a bus to transmit the value "1", or the value "1" itself that is transmitted, is called a recessive (meaning inferiority). When two nodes transmit the value "0" and the value "1" to the bus at the same time, the value "0" is given priority. The bus during idling is recessive. Each ECU 100 begins transmitting the message by changing the status of bus 200 from the recessive state to the dominant state, and other ECUs 100 read this change and perform synchronization. In FIG. 2, the solid line portion of lines of the message that indicate the dominant state and the recessive state indicates that the portion may have a corresponding dominant or recessive value. Regarding the SOF, which is always dominant, the line for the dominant state is solid while the line for the recessive state is broken.

The ID is a 11-bit value indicating the type of data included in the message. The CAN is designed such that higher priority is given to a message having a smaller ID value in communication arbitration between messages that two or more nodes begin transmitting at the same time.

The RTR is a 1-bit dominant indicating that the frame is a message (data frame).

Each of the IDE and r is a 1-bit dominant.

The DLC is a 4-bit value indicating the length of the data field that follows.

The data field is a value indicating the content of data that is transmitted; the maximum length of the data field is 64 bits, and the length thereof can be adjusted in units of 8 bits. The specification about allocation of data that is being sent to this section depends on the vehicle type or the manufacturer.

The CRC sequence is a 15-bit value calculated using transmission values of the SOF, the ID field, the control field, and the data field.

The CRC delimiter is a 1-bit recessive-fixed punctuation symbol marking the end of the CRC sequence. The receiving node determines the presence or absence of an anomaly in the received message by comparing the result of calculation involving the values of the SOF, the ID field, the control field, and the data field of the received message with the value of the CRC sequence.

The ACK slot is 1-bit long; using this portion, the transmitting node transmits a recessive. The receiving node transmits a dominant as an acknowledgement response upon successful receipt of the message up to the CRC sequence. Because the dominant is given priority, when the communication of one message is normal up to the CRC sequence, bus 200 during transmission of the ACK slot is dominant.

The ACK delimiter is a 1-bit recessive-fixed punctuation symbol marking the end of the ACK slot.

The EOF, which is 7 recessive-fixed bits, indicates the end of the message.

Note that the data format of a message is an example cited for the sake of explanation of a subject to which an unauthorized communication detection reference selection system or the like which determines whether the message is anomalous can be applied; this application subject is not limited to the above-described data format.

[1.3 Configuration of Gateway]

Figure 3:
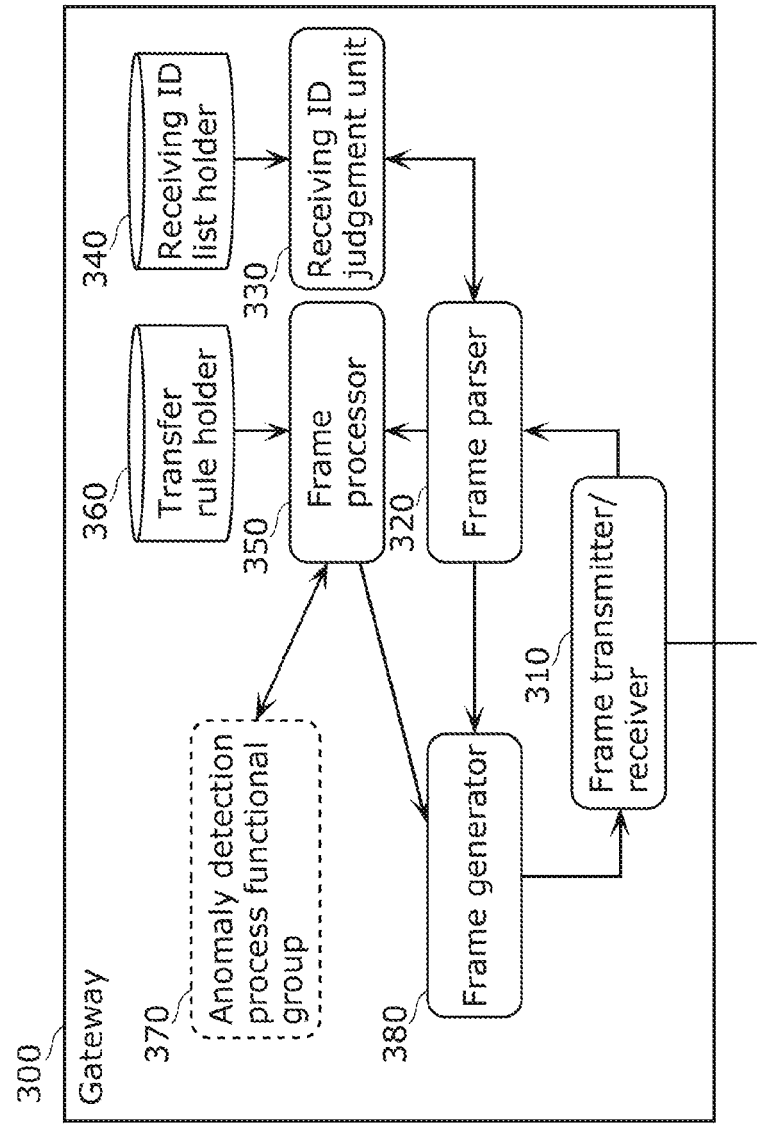
FIG. 3 is a block diagram illustrating one example of the functional configuration of a gateway included in an in-vehicle network system according to Embodiment 1.

FIG. 3 is a block diagram illustrating one example of the functional configuration of gateway 300 included in in-vehicle network system 10. Gateway 300 includes frame transmitter/receiver 310, frame parser 320, receiving ID judgement unit 330, receiving ID list holder 340, frame processor 350, transfer rule holder 360, anomaly detection process functional group 370, and frame generator 380. Gateway 300 selects a reference message to be used to detect unauthorized communication in in-vehicle network system 10 including a network and one or more electronic control units (ECUs) connected to the network.

Note that these structural elements are functional structural elements; gateway 300 is provided as an information processing device including, for example, a processing unit that is a processor, storage that is a semiconductor memory or the like, and an input/output unit that is an input/output port. The above functional structural elements are implemented by reading and executing, by the processing unit, a program held in the storage, holding predetermined data in the storage, or transmitting/receiving data via the input/output unit, or by a combination of these operations.

Frame transmitter/receiver 310 transmits and receives messages compliant with the CAN protocol to and from each of buses 200a, 200b. More specifically, frame transmitter/receiver 310 reads, on a bit-by-bit basis, the message sent to bus 200, and transfers the read message to frame parser 320. Furthermore, frame transmitter/receiver 310 sends the message to buses 200a, 200b on a bit-by-bit basis in accordance with bus information reported from frame generator 380. Frame transmitter/receiver 310 transfers a message between buses 200 by transmitting, to bus 200b, the message received from bus 200a, and transmitting, to bus 200a, the message received from bus 200b.

Frame parser 320 receives values of the message from frame transmitter/receiver 310 and parses the frame (message) through mapping of the values into fields in the CAN protocol. Frame parser 320 transfers, to receiving ID judgement unit 330, a series of values judged as the values of the ID field in the parsing.

Furthermore, according to the determination result reported from receiving ID judgement unit 330, frame parser 320 selects whether to transfer the values of the ID field of the message and the data fields appearing after the ID field to frame processor 350 or to stop receiving the message.

When frame parser 320 judges that the message is not compliant with the CAN protocol, frame parser 320 requests frame generator 380 to transmit an error frame. The error frame is a frame in a predetermined format specified in the CAN protocol that is different from the above-described message and is transmitted from a node when an error occurs in the CAN network. For example, when the error frame is sent to a bus, the most recent message transmission in the network is interrupted.

Furthermore, when frame parser 320 judges that the error frame transmitted by another node has been received, frame parser 320 discards the message that is being read.

Receiving ID judgement unit 330 receives the value in the ID field from frame parser 320 and determines, with reference to a list of message IDs held by receiving ID list holder 340, whether to receive the read message. Receiving ID judgement unit 330 reports the result of this determination to frame parser 320.

Receiving ID list holder 340 holds a list of message IDs of messages to be received by gateway 300 (hereinafter also referred to as a receiving ID list). FIG. 4 is a diagram illustrating one example of the data configuration of the receiving ID list. Details of the receiving ID list will be described later using this example.

Frame processor 350 selects a bus for a transfer destination according to the ID of the received message by following a transfer rule held by transfer rule holder 360 and notifies frame generator 380 of the bus for the transfer destination, the message ID reported by frame parser 320, and the data to be transferred.

Furthermore, frame processor 350 sends, to anomaly detection process functional group 370, the message received from frame parser 320, and requests anomaly detection process functional group 370 to determine whether the message is anomalous. Frame processor 350 does not transfer a message determined by anomaly detection process functional group 370 as being anomalous.

Transfer rule holder 360 holds a rule related to data transfer for each bus (hereinafter also referred to as a transfer rule). FIG. 5 is a diagram illustrating one example of the data configuration of the transfer rule. Details of the transfer rule will be described later using this example.

Anomaly detection process functional group 370 is a functional group that determines whether a message being received is anomalous. Details of functional elements included in anomaly detection process functional group 370 will be described later.

Frame generator 380 generates an error frame according to the error frame transmission request received from frame parser 320 and causes frame transmitter/receiver 310 to send the error frame.

Furthermore, frame generator 380 generates a message frame using the message ID and the data received from frame processor 350 and sends the message frame to frame transmitter/receiver 310 together with the bus information.

[1.4 Receiving ID List]

FIG. 4 is a diagram illustrating one example of the data configuration of the receiving ID list according to the present embodiment. The receiving ID list is a list of message IDs of messages to be received by gateway 300. In this example, each row includes the ID of a message to be received from bus 200 and processed in gateway 300. According to the settings of the receiving ID list in this example, gateway 300 receives messages having message IDs "1", "2", "3", and "4". Receiving messages having IDs not included in the receiving ID list is stopped. Note that the values of the IDs and the number of IDs included in the list in this example are examples for the sake of explanation; the configuration of the receiving ID list that is used by gateway 300 is not limited to this example.

[1.5 Transfer Rule]

FIG. 5 is a diagram illustrating one example of the data configuration of the transfer rule held in gateway 300 according to the present embodiment. In this example, each row shows a combination of buses for transfer source and destination for a message (200a, 200b in this example) and the ID of the message to be transferred. With the settings according to the transfer rule in this example, gateway 300 transfers, to bus 200b, a message received from bus 200a, regardless of what ID the message has.

Furthermore, among messages received from bus 200b, only a message having the message ID "3" is transferred to bus 200a.

[1.6 Configuration of Anomaly Detection Process Functional Group]

Figure 6:
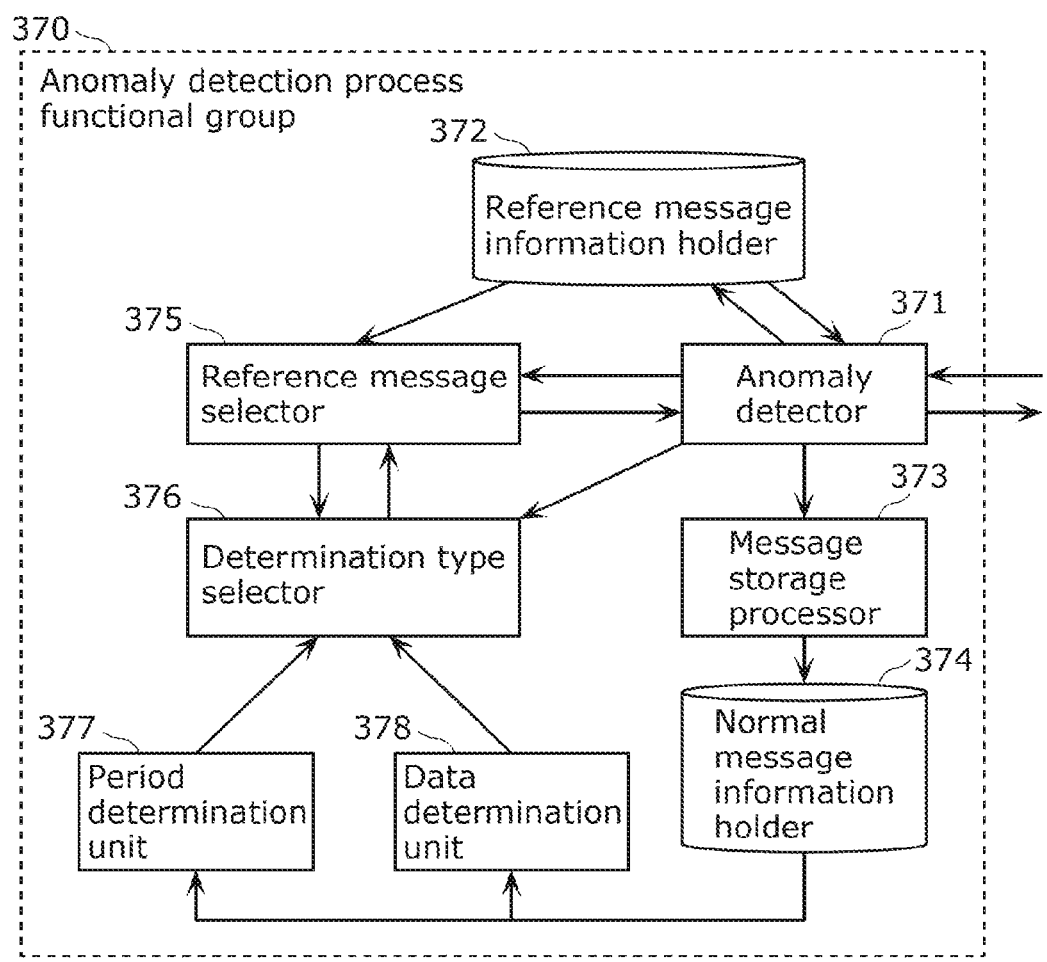
FIG. 6 is a block diagram illustrating one example of the functional configuration of an anomaly detection process functional group according to Embodiment 1.

FIG. 6 is a block diagram illustrating one example of the functional configuration of anomaly detection process functional group 370 according to the present embodiment. FIG. 6 is a block diagram illustrating the functional configuration of anomaly detection process functional group 370 included in gateway 300. Anomaly detection process functional group 370 includes anomaly detector 371, reference message information holder 372, message storage processor 373, normal message information holder 374, reference message selector 375, determination type selector 376, period determination unit 377, and data determination unit 378.

Note that the above functional structural elements are also implemented by reading and executing, by the processing unit, a program held in the storage, holding predetermined data in the storage, or transmitting/receiving data via the input/output unit, or by a combination of these operations, in gateway 300.

Anomaly detector 371 determines whether the message received from frame processor 350 is anomalous.

Anomaly detector 371 includes two or more different determination functions. With each of the determination functions, a rule (not illustrated in the drawings) set in advance and stored (saved) in the storage, which is different for each of the determination functions, is referred to, and the received message is checked according to the rule referred to, in other words, a determination is made on whether each message complies with said rule. Subsequently, on the basis of the determination results of the determination functions, anomaly detector 371 determines whether the received message is anomalous. When the received message is anomalous, anomaly detector 371 detects the occurrence of an anomaly.

Figure 7:
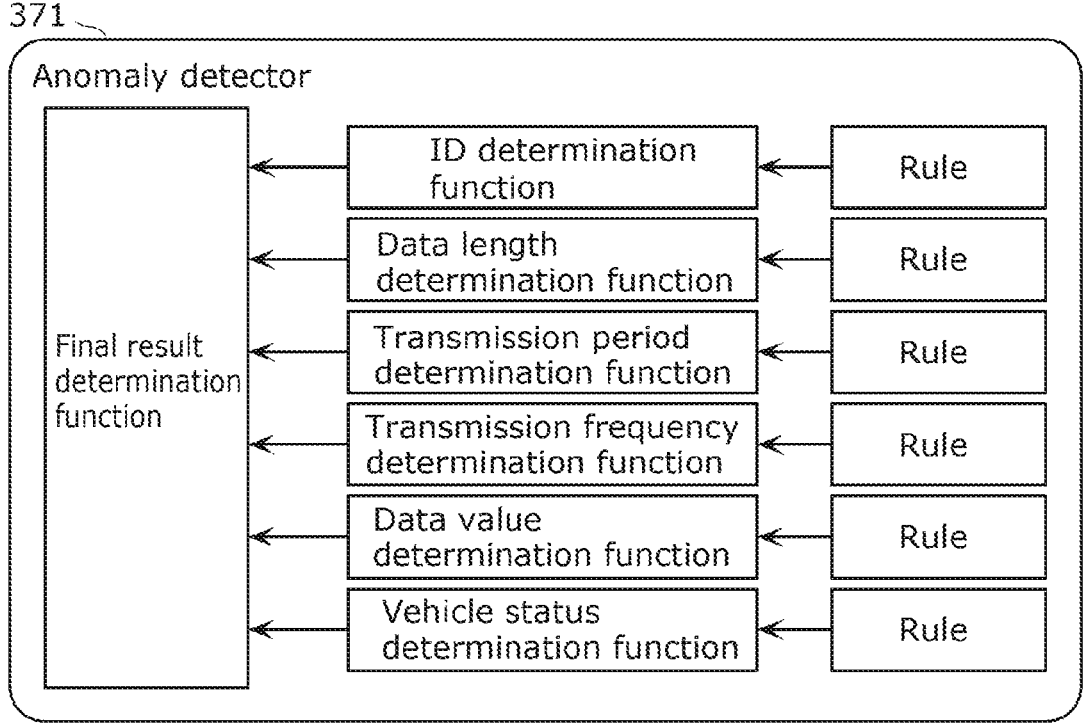
FIG. 7 is a block diagram illustrating one example of the functional configuration of an anomaly detector according to Embodiment 1.

FIG. 7 is a block diagram illustrating one example of the functional configuration of anomaly detector 371 according to the present embodiment. In this example, anomaly detector 371 includes six different determination functions each of which checks a predetermined point of a message. Specifically, the six different determination functions include: a function of checking the ID field of a message (an ID determination function); a function of checking the data length of a message (a data length determination function); a function of checking a period (a time interval) in which a message is transmitted (a transmission period determination function); a function of checking the frequency of message transmission (a transmission frequency determination function); a function of checking the value (data value) in the data field of a message (a data value determination function); and a function of recognizing the status of a vehicle on the basis of the determination results of these determination functions, the transmission period, the frequency, the data value, the amount of change in the data value, or the like, and checking the vehicle status (for example, a vehicle status determination function). Furthermore, anomaly detector 371 has a final result determination function which comprehensively determines, from the results of determination performed by these determination functions, whether the received message is anomalous. The result of the final result determination function is the result of anomaly detection performed by anomaly detector 371.

Note that the above functional structural elements are also implemented by reading and executing, by the processing unit, a program held in the storage, holding predetermined data in the storage, or transmitting/receiving data via the input/output unit, or by a combination of these operations, in gateway 300.

At the time of checking the predetermined point of a message with the above determination functions, there are cases where information of a previously received message having the same ID or information of a related message is used as a reference for the checking. With the determination functions, information of a message serving as a reference is obtained from reference message information holder 372.

Returning to the description of FIG. 6, anomaly detector 371 reports, to reference message information holder 372, information regarding a message that is to be a candidate of the reference message among the received messages. Anomaly detector 371 reports a message determined by the final result determination function as a "normal message" among the received messages to reference message information holder 372 as a message that is to be a candidate of the reference message (a reference message candidate). The reference message candidate is a candidate of the reference message to be used as a reference for determining whether a message sent to the network is anomalous.

Anomaly detector 371 further reports, to message storage processor 373, the message determined by the final result determination function as a "normal message".

Reference message information holder 372 holds information regarding the reference message to be used by anomaly detector 371 and information regarding candidates of the reference message. For example, when messages are transmitted periodically, the message with the same ID transmitted in the last period serves as the reference message. Meanwhile, the message received in the current period, which is a message (reference message candidate) that may become a reference message for a message in the next period, will be held in the current period as a reference message candidate.

Note that the information regarding the reference message indicates, for example, a reference message selected by reference message selector 375. The information regarding candidates of the reference message is one example of the candidate information and indicates, for example, one or more reference message candidates. The information regarding the reference message indicates, for example, one reference message candidate among the one or more reference message candidates included in the candidate information.

Note that reference message information holder 372 may further hold a message that can be used as a reference message when no reference message candidates are stored. Reference message information holder 372 may hold said message in advance.

Reference message information holder 372 holds the information regarding a message that is to be a candidate of the reference message, reported from anomaly detector 371. Furthermore, in response to a request from reference message selector 375, reference message information holder 372 reports, to reference message selector 375, the information regarding a message that is to be a candidate of the reference message. Furthermore, reference message information holder 372 also holds the information regarding the reference message selected by reference message selector 375, and reports the information regarding the reference message to anomaly detector 371 in response to a request from anomaly detector 371. When reference message selector 375 selects a reference message from among reference message candidates, reference message information holder 372 deletes the reference message candidates used at the time.

Message storage processor 373 performs the process of storing, into normal message information holder 374, information regarding the message reported from anomaly detector 371. Furthermore, when two or more messages with the same ID are stored in a period as normal messages and reference message selector 375 selects one of these messages with the same ID as a reference, message storage processor 373 deletes the messages other than the message selected as the reference message or stores the messages together with information indicating which message has been selected as the reference message.

Normal message information holder 374 holds information regarding a message determined by anomaly detector 371 as a normal message. This information is used when period determination unit 377 or data determination unit 378 calculates a predicted value of the data value or the receipt time of a currently received message from the previously received messages.

Reference message selector 375 selects a reference message to be used as a reference, on the basis of calculation of a difference in transmission time between the currently received message and the message with the same ID received in the last period, which is calculated by the transmission period determination function of anomaly detector 371, and the amount of change between the currently received message and the message with the same ID received in the last period, which is calculated by the data value determination function of anomaly detector 371.

For example, regarding messages that are transmitted periodically, if it is assumed that there is a time length a (refer to FIG. 8) margin before and after the scheduled receipt time (for example, refer to expected receipt time T1 indicated in FIG. 8) and there is a data value margin before and after the amount of change in data, there are cases where two or more messages that are not beyond these margins are transmitted. In this case, reference message selector 375 sets these messages to reference message candidates and selects a message to be used as a reference message for a message with the same ID that is to be received in the next period.

Reference message selector 375 obtains, from reference message information holder 372, the information regarding messages that are to be candidates of the reference message (reference message candidates), and selects a message to be used as the reference message from the candidates using the selection method selected by determination type selector 376.

At the time of selecting a reference message, reference message selector 375 reports candidates of the reference message to determination type selector 376, and selects the reference message from the reference message candidates using the determination type corresponding to the result of selection by determination type selector 376.

Determination type selector 376 selects, on the basis of one or more reference message candidates, a selection method for selecting a reference message from among the one or more reference message candidates. The selection method, which includes at least two determination methods, includes at least one of: a period determination method for making a determination for selecting a reference message on the basis of a period in which a message to be sent to the network is sent; and a data determination method for making a determination for selecting a reference message on the basis of the value of data included in the message sent to the network. In the present embodiment, the selection method includes the period determination method and the data determination method.

Determination type selector 376 obtains, for example, the candidate of the reference message reported from reference message selector 375 and the value of a rule held by anomaly detector 371, and requests period determination unit 377 and data determination unit 378 to make the determination. Determination type selector 376 selects, from a degree of clearness obtained as a result of the determination by period determination unit 377 and a degree of clearness obtained as a result of the determination by data determination unit 378, which of the determination types, namely, the period determination and the data value determination, is to be used to select a reference message from the one or more reference message candidates, and reports the result of the selection to reference message selector 375.

Note that although the method for calculating the degree of clearness will be described later, the degree of clearness indicates how clearly the reference message can be selected from among the one or more reference message candidates. In other words, the degree of clearness indicates the level of appropriateness of a reference message candidate among the one or more reference message candidates as the reference message. To put it differently, the degree of clearness indicates the level of appropriateness of selecting a reference message from among the one or more reference message candidates using each of a plurality of selection methods. The degree of clearness is one example of the level of appropriateness.

For example, assume that there are message M1 (refer to FIG. 8) and message M2 (refer to FIG. 8) as the reference message candidates, and upon comparison with the current reference message, when the difference between message M1 and the reference message and the difference between message M2 and the reference message are substantially the same, the degree of clearness is low, and when the difference between message M1 and the reference message and the difference between message M2 and the reference message are significantly different, the degree of clearness is high. Subsequently, determination type selector 376 selects a determination type with a high degree of clearness from among the period determination and the data value determination. For example, determination type selector 376 selects the determination type with the highest degree of clearness (the best clearness) from among the period determination and the data value determination. In other words, for example, determination type selector 376 calculates degrees of clearness in the plurality of selection methods and selects a selection method with the highest degree of clearness among the plurality of selection methods as the selection method for selecting a reference message from among the one or more reference message candidates.

Therefore, it is possible to select a reference message using determination of a type with which the determination is clearly possible because of a significant difference between messages of reference message candidates in terms of the difference between each of said messages and the reference message, instead of determination of a type with which the determination is difficult because of a slight difference between messages of reference message candidates in terms of the difference between each of said messages and the reference message; thus, the selection of the reference message by reference message selector 375 can be more reliable.

At the time of comparing the degree of clearness obtained from period determination unit 377 and the degree of clearness obtained from data determination unit 378, determination type selector 376 normalizes the degrees of clearness using margins under the respective rules in order to represent the degrees of clearness in the same form of value, for example. For example, when the margin for the receipt time is the range of a plus and minus expected value T1 (refer to FIG. 8), determination type selector 376 selects a determination type using a value obtained by dividing the degree of clearness obtained from period determination unit 377 by $2\alpha$. Note that in FIG. 8 described later, expected value T1 indicates expected value T1 of time and is also referred to as expected receipt time T1.

Note that the normalization using the margin under the rule has thus far been described as a method for normalizing the degree of clearness, but this is not limiting. For example, when the margin is the range of a plus and minus expected value T1, the degree of clearness may be divided by α or expected value T1 (predicted value), instead of 2α, in the normalization. Alternatively, an amount of deviation between expected value T1 and actual receipt time or an actual data value may be measured in advance using test data or the like, variance value a of the amount of deviation may be calculated, and the normalization may be performed using the variance value (such as σ, 2σ, and 3σ). This is not limiting; any method in which values in different units can be normalized is applicable. Furthermore, when it is known in advance that there is a difference between the clearness (the degree of clearness) of the selection result of the period determination and the clearness (the degree of clearness) of the selection result of the data determination, this may be taken into consideration in the normalization. For example, when the degree of clearness of the period determination is higher than the degree of clearness of the data determination, the normalized degree of clearness of the period determination may further be multiplied by a coefficient or a constant may be added thereto.

Period determination unit 377 calculates expected receipt time (T1) in the current period as the predicted value of the receipt time from the receipt time of the current reference message and information of the period included in the rule referred to by the transmission period determination function of anomaly detector 371. By comparing the expected receipt time (T1), which is the predicted value, and the receipt time of each of a plurality of reference message candidates reported from determination type selector 376, period determination unit 377 selects a reference message from among the plurality of reference message candidates.

Figure 8:
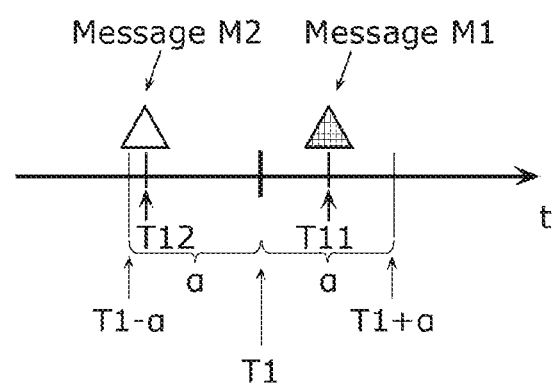
FIG. 8 is a diagram illustrating a reception pattern of a message according to Embodiment 1.

FIG. 8 is a diagram illustrating a reception pattern of a message according to the present embodiment. For example, as illustrated in FIG. 8, when the receipt time of message M1 is T11 and the receipt time of message M2 is T12, both T11 and T12 are in the range between T1−α and T1+α, which is the range of the margin under the rule, and therefore anomaly detector 371 determines both the messages as normal messages. It is, however, necessary to select one of the messages as the reference message. Thus, period determination unit 377 selects, as the reference message, one of message M1 and message M2 whose receipt time (T11) or (T12) is close to the expected receipt time (T1) which is the predicted value. In FIG. 8, period determination unit 377 selects message M1 as the reference message because the receipt time of message M1 is closer to the expected receipt time (T1) than the receipt time of message M2 is.

Period determination unit 377 calculates the degree of clearness from the difference between the receipt time of each of the plurality of reference message candidates and the expected receipt time which is the predicted value. For example, in FIG. 8, the difference (|(T11−T1)−(T1−T12)| or ||T11−T1|−|T12−T1||) between the difference (T11−T1) between receipt time T11 of message M1 and expected receipt time T1 and the difference (T1−T12) between receipt time T12 of message M2 and expected receipt time T1 is defined as the degree of clearness. Here, "|A|" represents the absolute value of A. For example, when message M1 and message M2 are substantially equally distanced from expected receipt time T1 as the center, specifically, when |T11−T1| and |T12−T1| have substantially the same values, the degree of clearness is low. In contrast, as illustrated in FIG. 8, when receipt time T11 of message M1 is closer to expected receipt time T1 than receipt time T12 of message M2 is, specifically, when |T11−T1| is sufficiently smaller than |T12−T1|, the degree of clearness is high.

Note that the difference (T11−T1) and the difference (T1−T12) are one example of the first difference, and the difference (|(T11−T1)−(T1−T12)|) or the difference (||T11−T1|−|T12−T1||) is one example of the second difference. The degree of clearness is, for example, a positive value (for example, an absolute value). In the present embodiment, the second difference means the degree of clearness. In other words, the degree of clearness indicates a level of inclusion of an anomalous message in the one or more reference message candidates.

Note that period determination unit 377 may calculate a predicted value as the expected receipt time of a message to be received, from the information of the receipt time of each of two or more messages with the same ID held by normal message information holder 374, or may calculate a predicted value as the expected receipt time of a message to be received, from the information of the receipt time of each of one or more messages with different IDs correlated with the receipt time.

Returning to the description of FIG. 6, data determination unit 378 calculates an expected data value (D1) in the current period as a predicted value of the data value, from information of the amount of change between the data value of the current reference message and the data value included in the rule referred to by the data value determination function of anomaly detector 371. Data determination unit 378 compares the data value of each of the plurality of reference message candidates reported from determination type selector 376 and the expected data value (D1) which is the predicted value, and selects a reference message from among the plurality of reference message candidates.

Furthermore, data determination unit 378 calculates the degree of clearness from the difference between the data value of each of the plurality of reference message candidates and the expected data value which is the predicted value. For example, as in period determination unit 377, the difference (|(D11−D1)−(D1−D12)| or ||D11−D1|−|D12−D1||) between the difference (D11−D1) between data value D11 of message M1 and expected data value D1 and the difference (D1−D12) between data value D12 of message M2 and expected data value D1 is defined as the degree of clearness. Note that the difference (D11−D1) and the difference (D1−D12) are one example of the first difference, and the difference (|(D11−D1)−(D1−D12)|) or the difference (||D11−D1|−|D12−D1||) is one example of the second difference. In the present embodiment, the second difference means the degree of clearness. In other words, the degree of clearness indicates a level of inclusion of an anomalous message in the one or more reference message candidates.

As described above, in the determination method, the difference between the predicted value for the message sent to the network and each value of the information regarding the reference message candidates is calculated, and the difference (the second difference) between said calculated differences (the first differences) is defined as the degree of clearness. Thus, the degree of clearness can be calculated according to the message stored as a candidate of the reference message.

Note that data determination unit 378 may calculate a predicted value as the expected data value of a message to be received, from the data value of each of two or more messages with the same ID held by normal message information holder 374, or may calculate a predicted value as the expected data value of a message to be received, from the information of the data value of each of one or more messages with different IDs correlated with the data value.

Period determination unit 377 or data determination unit 378 may predict the predicted value on the basis of a predictive model created in advance for enabling calculation of the predicted value. Period determination unit 377 or data determination unit 378 may obtain, as the predicted value, output data (the predicted value of the data value or the receipt time) obtained when the data value of each of two or more messages with the same ID or the receipt time of each of two or more messages with the same ID is input to the predictive model as input data, for example. For example, period determination unit 377 or data determination unit 378 may generate an auto-regressive (AR) model, an auto-regressive moving average (ARMA) model, a hidden Markov model (HMM), a Bayesian model, a support vector machine (SVM) model, a neural network model, a deep learning model, or the like from information regarding the normal message using machine learning, statistical processing, or probability theory, and calculate, using said model, a predicted value related to the expected receipt time or the expected data value of a message to be received.

Furthermore, period determination unit 377 or data determination unit 378 may set a value indicated in the current or previous reference message (the reference message for the current frame or the previous frame) to the predicted value to be used to select a reference message for the next reception period. Data determination unit 378 may set, for example, a value (a data value) indicated in the current or previous reference message to the predicted value to be used to select a reference message for the next reception period. For example, the predicted value may be calculated on the basis of a value indicated in the previous reference message. For example, the predicted value may be the mean, the median, and the mode of the values indicated in previous reference messages or may be the same value as a value indicated in the immediate previous reference message. Note that in the present embodiment, the value indicated in the reference message is the receipt time or the data value, for example.

Note that when there are three or more reference message candidates, period determination unit 377 or data determination unit 378 may determine one message M1 as the reference message from among the entire reference message candidates, then determine message M2 that is the next feasible reference message candidate from among the rest of messages that have failed to be determined first as the reference message, and calculate the degree of clearness from two messages that are message M1 determined first as the reference message and message M2 determined second as the reference message. For example, when there are three or more reference message candidates (for example, when the number of values indicated in the one or more reference message candidates is three or more), period determination unit 377 or data determination unit 378 may extract two reference message candidates (for example, two values) close to the predicted value, and calculate the degree of clearness on the basis of the predicted value and values indicated in the extracted two reference message candidates.

Note that each of period determination unit 377 and data determination unit 378 has thus far been described as determining, as the reference message, a message having a value simply similar to the predicted value, but this is not limiting. It is sufficient that period determination unit 377 or data determination unit 378 can determine one message as the reference message from among the plurality of reference message candidates; for example, assuming that actual receipt time and actual data values, etc., of normal messages are true values, period determination unit 377 or data determination unit 378 may learn the amounts of deviation between the true values and the predicted value in advance using test data or the like, and determine a message as the reference message by taking the distribution of said amounts of deviation into consideration. For example, when the actual receipt time is not frequently later than the predicated value, period determination unit 377 or data determination unit 378 may recognize a slight delay as a significant difference relative to the predicted value, and when the actual receipt time is earlier than the predicted value, recognize a significant difference as a slight difference. Furthermore, period determination unit 377 or data determination unit 378 may use other indicators than the amount of deviation or may learn a received message in real time instead of learning in advance. At this time, the distribution is taken into consideration in the calculation of the degree of clearness as well.

Note that each of period determination unit 377 and data determination unit 378 has thus far been described as calculating the degree of clearness from the difference between the predicted value and the information of the plurality of reference message candidates, but this is not limiting. Period determination unit 377 or data determination unit 378 may calculate the degree of clearness in advance for each determination type. At this time, determination type selector 376 may select, as the determination type to be used to select the reference message, a determination type with the highest degree of clearness among the rules related to the received messages that are held by anomaly detector 371.

Note that the information regarding candidates of the reference message held by reference message information holder 372 is, for example, information such as message ID, DLC, data values, and receipt time. Furthermore, reference message information holder 372 may hold information of a rule for each message ID that is required at the time of selecting the reference message. The data value to be stored may be all the data values received, may be only a data value in a specific region among the data values received, may be the data values with no change, or may be the result of some computation performed on the data values.

Note that anomaly detector 371 has thus far been described as reporting a message determined by the final result determination function as a "normal message" among the received messages to reference message information holder 372 as a message that is to be a candidate of the reference message, but this is not limiting. For example, aside from a rule for determining whether a message is a normal message, a rule for determining whether a message is a reference message may be held, and a message satisfying this rule may be reported to reference message information holder 372 as a reference message candidate. Thus, anomaly detector 371 can set only a message more suitable as the reference message among the normal messages to the reference message candidate. Furthermore, conversely, anomaly detector 371 can set an anomalous message slightly different from a normal message to the reference message candidate, meaning that the reference message can be selected from a wide range of messages.

[1.7 Configuration of ECU]

Figure 9:
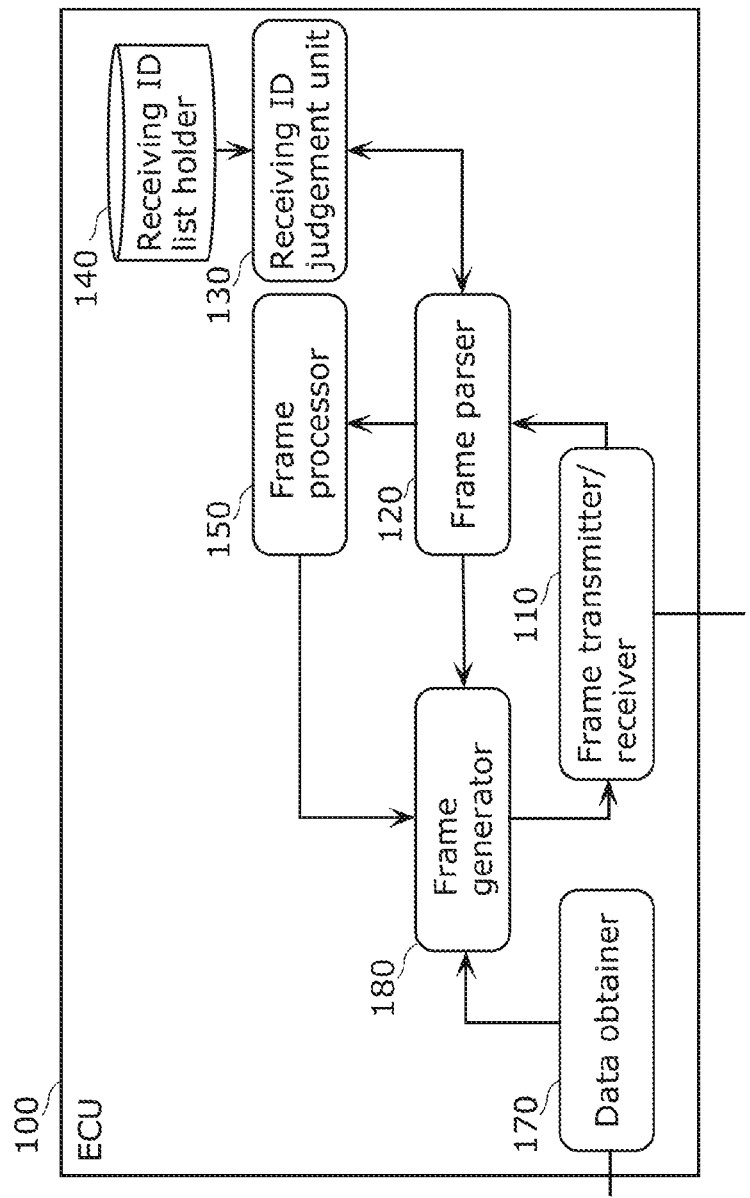
FIG. 9 is a block diagram illustrating one example of the functional configuration of an ECU included in an in-vehicle network system according to Embodiment 1.

FIG. 9 is a block diagram illustrating one example of the functional configuration of ECU 100 included in an in-vehicle network system 10 according to the present embodiment. ECU 100 includes frame transmitter/receiver 110, frame parser 120, receiving ID judgement unit 130, receiving ID list holder 140, frame processor 150, data obtainer 170, and frame generator 180.

Note that these structural elements are functional structural elements; ECU 100 is provided as an information processing device including, for example, a processing unit that is a processor, storage that is a semiconductor memory or the like, and an input/output unit that is an input/output port. The above functional structural elements are implemented by reading and executing, by the processing unit, a program held in the storage, holding predetermined data in the storage, or transmitting/receiving data via the input/output unit, or by a combination of these operations.

Frame transmitter/receiver 110 transmits and receives messages compliant with the CAN protocol to and from bus 200. More specifically, frame transmitter/receiver 110 reads, on a bit-by-bit basis, the message sent to bus 200, and transfers the read message to frame parser 120. Furthermore, frame transmitter/receiver 110 sends, to bus 200, the message reported from frame generator 180.

Frame parser 120 receives values of the message from frame transmitter/receiver 110 and parses the frame (message) through mapping of the values into fields in the CAN protocol. Frame parser 120 transfers, to receiving ID judgement unit 130, a series of values judged as the values of the ID field in the parsing.

Furthermore, according to the determination result reported from receiving ID judgement unit 130, frame parser 120 selects whether to transfer the value in the ID field of the message and the data fields appearing after the ID field to frame processor 150 or to stop receiving the message.

When frame parser 120 judges that the message is not compliant with the CAN protocol, frame parser 120 requests frame generator 180 to transmit an error frame.

Furthermore, when frame parser 120 judges that the error frame transmitted by another node has been received, frame parser 120 discards the message that is being read.

Receiving ID judgement unit 130 receives the value in the ID field from frame parser 120 and determines, with reference to a list of message IDs held by receiving ID list holder 140, whether to receive the read message. Receiving ID judgement unit 130 reports the result of this determination to frame parser 120.

Receiving ID list holder 140 holds a receiving ID list that is a list of message IDs of messages to be received by ECU 100. The receiving ID list is substantially the same as that illustrated in FIG. 4, and description thereof here will be omitted.

Frame processor 150 performs a process dependent on data of the received message. Details of the process vary among ECUs 100. For example, when ECU 100a receives a message indicating that a door is open while the speed per hour exceeds 30 km, ECU 100a performs a process to sound an alarm. When a door is opened while ECU 100c receives a message indicating that the brake is not applied, ECU 100c performs a process to sound an alarm. These processes are examples cited for the sake of explanation; ECU 100 may perform processes other than these. Frame processor 150 causes frame generator 180 to generate a frame to be sent to perform such processes.

Data obtainer 170 obtains output data indicating, for example, the status of a device connected to each ECU 100 or a value measured by a sensor, and transfers the obtained output data to frame generator 180.

Frame generator 180 generates an error frame according to the error frame transmission request reported from frame parser 120 and sends the error frame to frame transmitter/receiver 110.

Furthermore, frame generator 180 attaches predetermined message ID to the value of the data received from data obtainer 170, generates a message frame, and sends the message frame to frame transmitter/receiver 110.

[1.8 Anomaly Detection Process]

Figure 10:
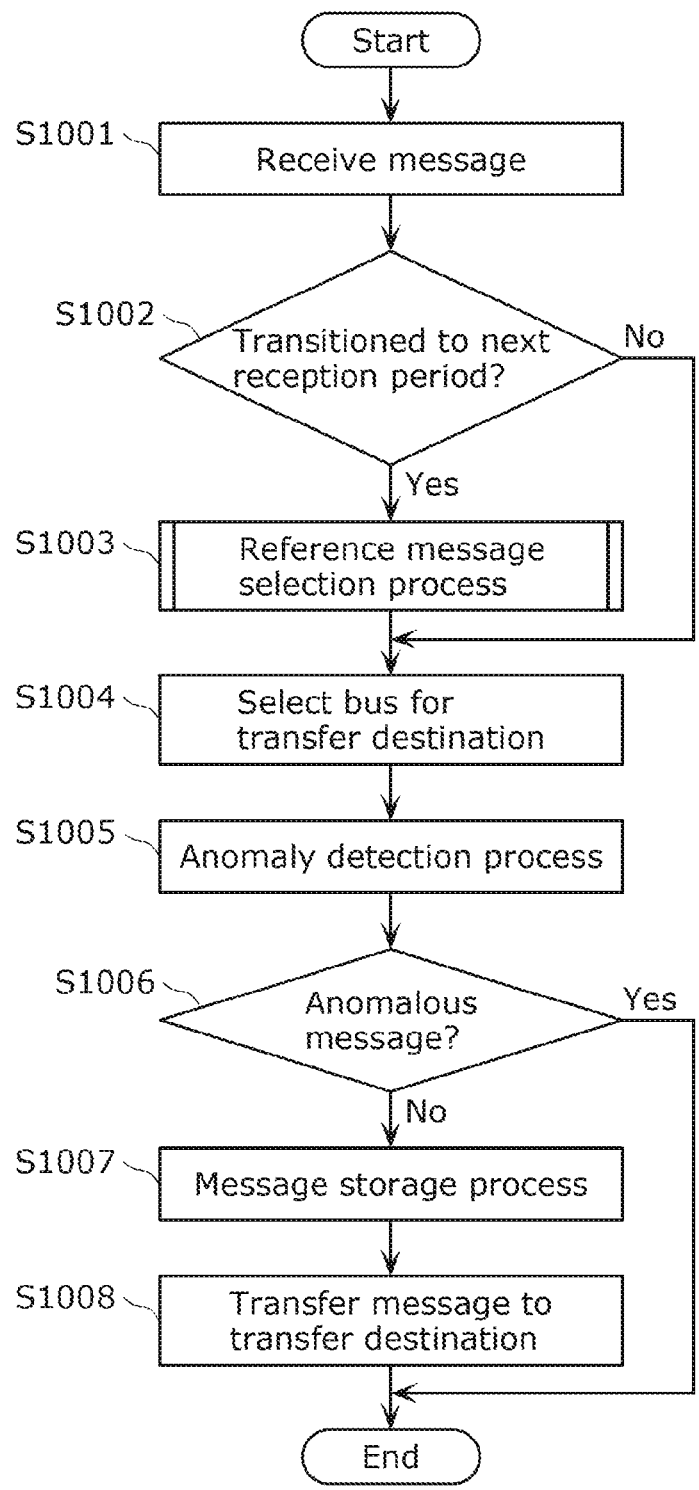
FIG. 10 is a flowchart illustrating one example of an anomaly detection process according to Embodiment 1.

FIG. 10 is a flowchart illustrating one example of an anomaly detection process according to the present embodiment. Specifically, FIG. 10 is a flowchart illustrating one example of the anomaly detection process performed in anomaly detection process functional group 370.

First, anomaly detector 371 receives a message from frame processor 350 (Step S1001).

Anomaly detector 371 that has received the message determines whether a reception period for messages that are transmitted periodically has transitioned to the next reception period (Step S1002).

In Step S1002, when anomaly detector 371 determines that the reception period has transitioned to the next reception period (Yes in S1002), anomaly detector 371 requests reference message selector 375 to select a new reference message, and reference message selector 375 selects a reference message (Step S1003).

After a new reference message is selected in Step S1003 or when the reception period is determined as not having transitioned to the next reception period in Step S1002 (NO in S1002), frame processor 350 selects a bus for transfer destination according to the transfer rule held by transfer rule holder 360 (Step S1004).

Frame processor 350 reports the value in each field of the message received from frame parser 320 to anomaly detection process functional group 370, and requests anomaly detection process functional group 370 to determine whether the message is anomalous. Anomaly detector 371 performs the anomaly detection process (Step S1005). Using various determination functions such as the ID determination function, anomaly detector 371 determines whether the received message is anomalous or normal. At this time, various determination functions of anomaly detector 371 perform the determination using the reference message selected in Step S1003.

The final result determination function of anomaly detector 371 performs the final comprehensive determination on said message, specifically, comprehensively determines whether the received message is anomalous, from the results of determination performed by various determination functions such as the ID determination function (Step S1006), and reports the results of the determination to frame processor 350. Step S1006 is one example of the step of determining.

When anomaly detector 371 determines the message as being anomalous (Yes in Step S1006), said message is not stored or transferred.

When the message is determined as being normal instead of being anomalous in Step S1006 (No in Step S1006), anomaly detector 371 performs: the process of requesting message storage processor 373 to store the normal message, and storing (saving) information regarding the normal message into normal message information holder 374 by message storage processor 373; and the process of storing (saving) the message into reference message information holder 372 as a reference message candidate (S1007). Step S1007 is one example of the step of storing.

Subsequently, frame processor 350 requests frame generator 380 to transfer the message to the bus for the transfer destination selected in Step S1004. In response to the request from frame processor 350, frame generator 380 generates a message to be received by the designated transfer destination, and causes frame transmitter/receiver 310 to send said message. In other words, frame generator 380 transfers the message to the transfer destination via frame transmitter/receiver 310 (Step S1008).

[1.9 Reference Message Selection Process]

Figure 11:
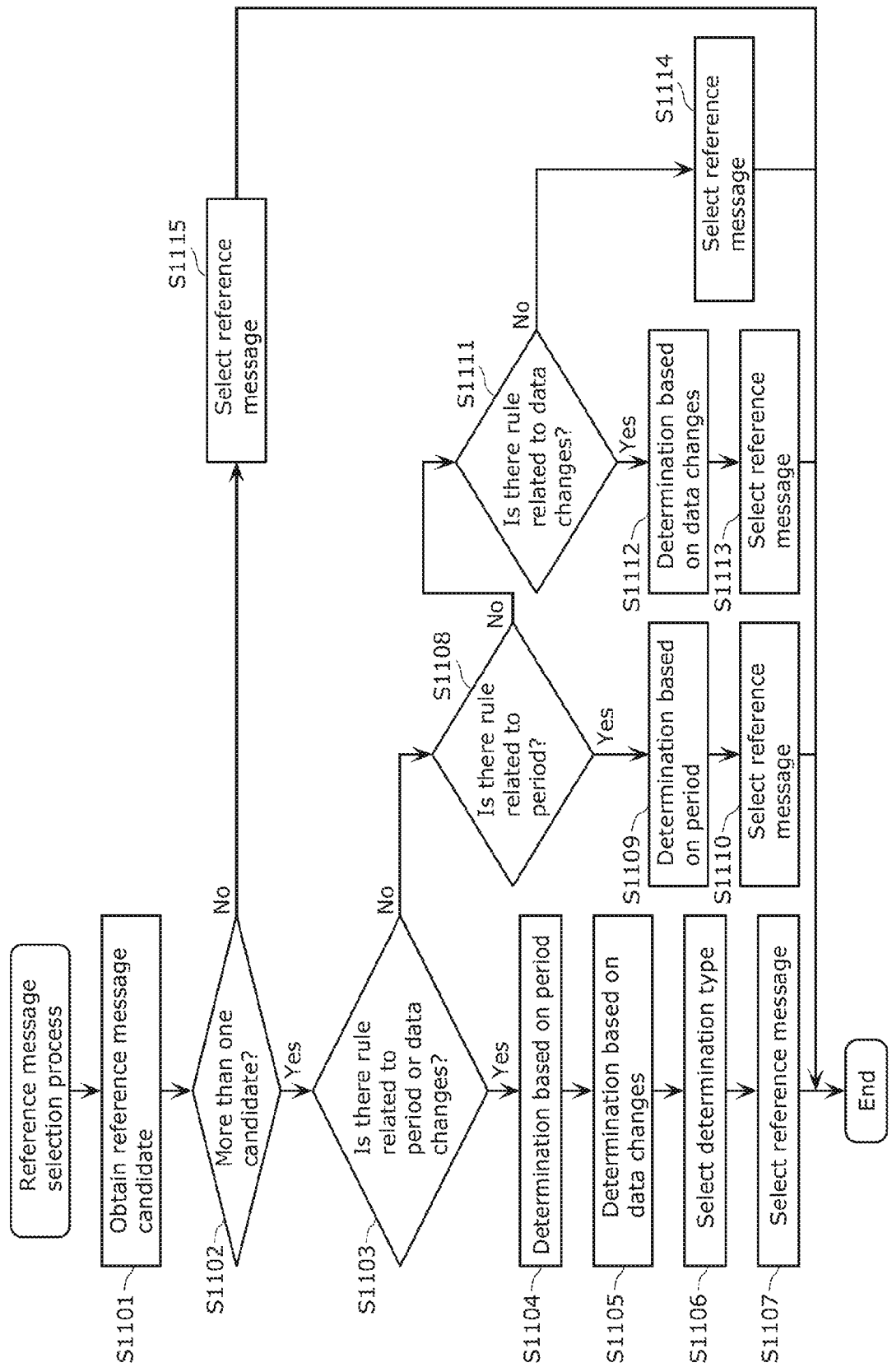
FIG. 11 is a flowchart illustrating one example of a reference message detection process according to Embodiment 1.

FIG. 11 is a flowchart illustrating one example of a reference message selection process according to the present embodiment. Specifically, FIG. 11 is a flowchart illustrating one example of the reference message selection process performed in anomaly detection process functional group 370.

First, reference message selector 375 obtains a reference message candidate from reference message information holder 372 (S1101).

Reference message selector 375 determines whether there is one or more than one message obtained from reference message information holder 372 that is to be a reference message candidate (S1102).

When there is more than one message that is to be a reference message candidate in Step S1102 (Yes in Step S1102), reference message selector 375 requests determination type selector 376 to select a determination method for selecting the reference message. Note that the plurality of reference message candidates may include an anomalous message.

Determination type selector 376 obtains, from anomaly detector 371, a rule associated with the message ID, and checks whether there are two rules including a rule related to the period and a rule related to changes in the data value (S1103).

When there are both the rule related to the period and the rule related to changes in the data value in Step S1103 (Yes in Step S1103), determination type elector 376 requests period determination unit 377 to perform the determination based on the period, and period determination unit 377 determines a message as the reference message from the receipt time of each of the plurality of reference message candidates (S1104). Furthermore, determination type selector 376 requests data determination unit 378 to perform the determination based on changes in the data value, and data determination unit 378 determines a message as the reference message from the data value of each of the plurality of reference message candidates (S1105).

Determination type selector 376 selects, from the result of the determination performed by period determination unit 377 and the result of the determination performed by data determination unit 378, which of the determination types (determination methods) is to be used (S1106), and reports the selected determination type to reference message selector 375. Determination type selector 376 performs the selection in Step S1106, for example, on the basis of the degree of clearness obtained from period determination unit 377 and the degree of clearness obtained from data determination unit 378. For example, the result of the selection may include the degrees of clearness. Step S1106 is one example of the step of selecting the selection method.

Reference message selector 375 selects a final reference message using the determination method reported from determination type selector 376 (S1107). By selecting the reference message on the basis of the degree of clearness, reference message selector 375 can select, as the reference message, a message different from an anomalous message among the one or more reference message candidates. Step S1107 is one example of the step of selecting the reference message.

When the result of Step S1103 is No, determination type selector 376 checks whether there is a rule related to the period (S1108). When there is a rule related to the period in Step S1108 (Yes in Step S1108), determination type selector 376 requests period determination unit 377 to perform the determination based on the period, and period determination unit 377 determines a message as the reference message from the receipt time of each of the plurality of reference message candidates (S1109). Determination type selector 376 selects, as the final reference message, the message determined by period determination unit 377 as the reference message (S1110).

When the result of Step S1108 is No, determination type selector 376 checks whether there is a rule related to data changes (S1111). When there is a rule related to data changes in Step S1111 (Yes in S1111), determination type selector 376 requests data determination unit 378 to perform the determination based on changes in the data value, and data determination unit 378 determines a message as the reference message from the amount of change in the data value of each of the plurality of reference message candidates (S1112). Determination type selector 376 selects, as the final reference message, the message determined by data determination unit 378 as the reference message (S1113).

When the result of Step S1111 is No, determination type selector 376 reports, to reference message selector 375, that the determination is impossible. Reference message selector 375 selects the final reference message by a predetermined method from among the plurality of reference message candidates (S1114).

When the result of Step S1102 is No, specifically, when there is only one message that is to be a reference message candidate, reference message selector 375 selects said one reference message candidate as the reference message (S1115). In this case, the process of calculating the degree of clearness is not performed.

Note that reference message selector 375 may determine whether there are both the rule related to the period and the rule relates to changes in the data value, and only when there are both the rules, request determination type selector 376 to select which of the determination types is to be used. At this time, reference message selector 375 may select the reference message by requesting period determination unit 377 to perform the determination based on the period when there is only the rule related to the period, requesting data determination unit 378 to perform the determination based on the data value when there is only the rule related to the data value, and performing the determination by a predetermined method when there is none of these rules. Even when there is neither the rule related to the period or the rule related to the data value, the reference message may be selected using a predicted value of the receipt time or the data value in the case where the receipt time or the data value can be predicted.

[1.10 Advantageous Effects]

In the present embodiment, in the anomaly detection process performed by anomaly detection process functional group 370, at the time when various determination functions of anomaly detector 371 select a reference message to be used, the type of determination, the period determination or the data value determination, in which more clear determination is possible is selected, and the reference message is selected from the result of the determination of the selected type. This makes it possible to reduce conventionally possible situations where anomaly detection fails as a result of using an anomalous message as the reference message; thus, whether a message is anomalous can be determined with improved accuracy. As a result, in-vehicle network system 10 has improved safety.

Embodiment 2

[2. Outline]

As Embodiment 2, the following describes, with reference to the drawings, an in-vehicle network system in which some of the functions of the anomaly detection process functional group are disposed in a server outside the vehicle and in which the gateway and the server communicate with each other.

[2.1 Overall Configuration of In-Vehicle Network System]

Figure 12:
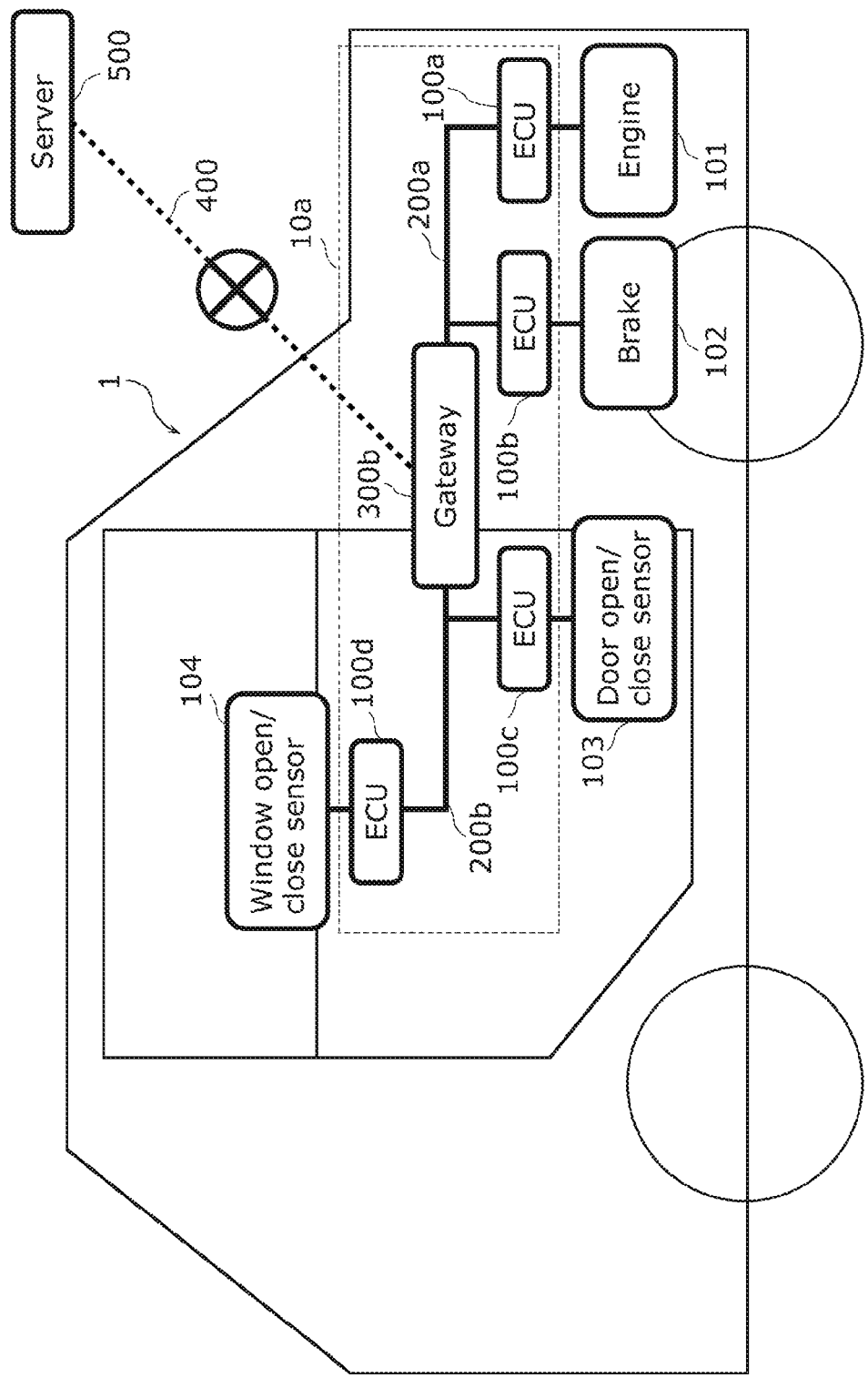
FIG. 12 is a block diagram illustrating the overall configuration of an in-vehicle network system according to Embodiment 2.

FIG. 12 is a block diagram illustrating the overall configuration of in-vehicle network system 10a according to the present embodiment. In FIG. 12, the same structural elements as those in in-vehicle network system 10 illustrated in FIG. 1 are indicated by the same reference signs, and description thereof will be omitted.

In-vehicle network system 10a has a CAN network and includes: an ECU (that is ECU 100a, ECU 100b, ECU 100c, and ECU 100d in this figure; hereinafter, these will also be collectively referred to as ECU 100 or an unspecified portion of these will also be referred to as ECU 100); a bus (that is bus 200a and bus 200b in this figure; hereinafter, these will also be collectively referred to as bus 200 or an unspecified one of these will also be referred to as bus 200); gateway 300b, external network 400, and server 500.

Gateway 300b connects bus 200a to which ECU 100a and ECU 100b are connected and bus 200b to which ECU 100c and ECU 100d are connected. Gateway 300b has a function of transferring the message received from one bus to the other bus. Gateway 300b is also one node in the CAN network.

External network 400 is a communication network for gateway 300b and server 500 to communicate with each other. The communication method in external network 400 may be wired or wireless communication. The wireless communication system is not particularly limited and may be, for example, Wi-Fi, third generation network technology (3G), or long-term evolution (LTE), which is existing technology.

Server 500 communicates with gateway 300b via external network 400.

Each of gateway 300b and server 500 is assigned some of the functions of anomaly detection process functional group 370 according to Embodiment 1, and gateway 300b and server 500 operate in conjunction to perform the anomaly detection process of anomaly detection process functional group 370 according to Embodiment 1.

[2.2 Configuration of Gateway]

Figure 13:
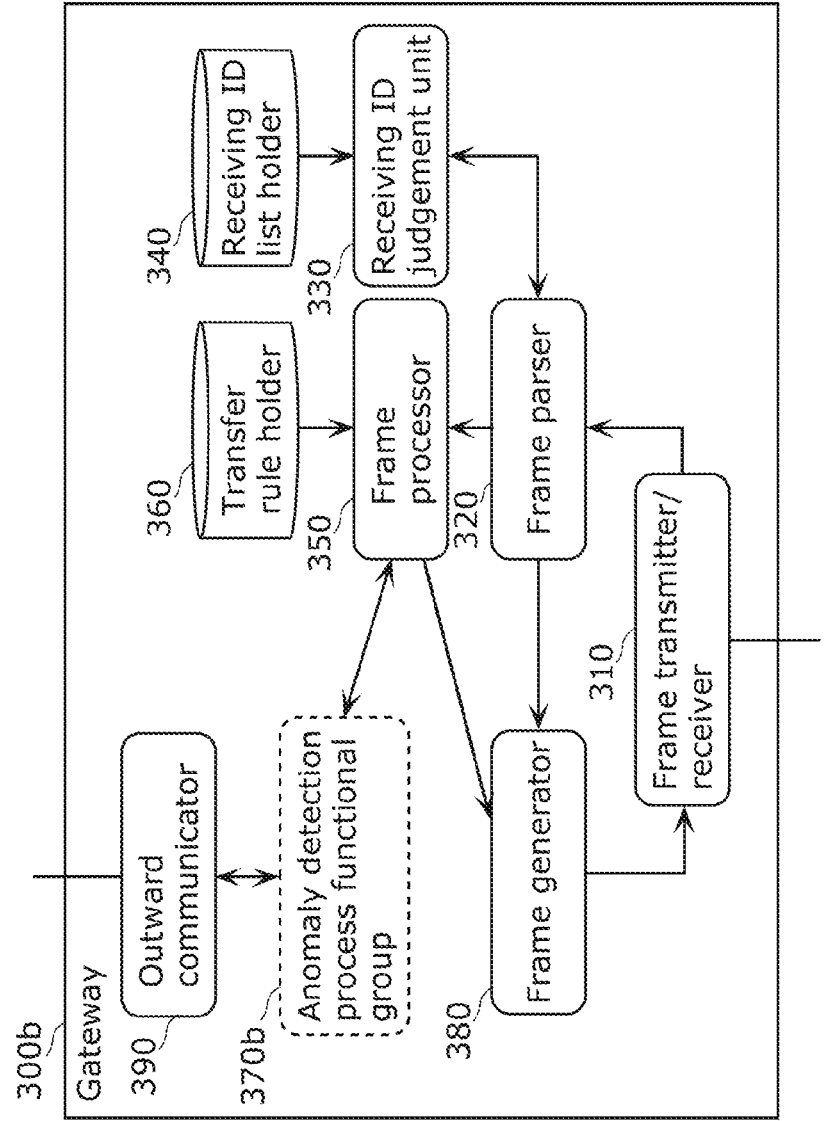
FIG. 13 is a block diagram illustrating one example of the functional configuration of a gateway included in an in-vehicle network system according to Embodiment 2.

FIG. 13 is a block diagram illustrating one example of the functional configuration of gateway 300b included in in-vehicle network system 10a according to the present embodiment. In FIG. 13, the same structural elements as those illustrated in FIG. 3 are indicated by the same reference signs, and description thereof will be omitted. The following description will focus on the aspects of gateway 300b that are different from gateway 300.

Gateway 300b is different in that gateway 300b includes anomaly detection process functional group 370b instead of anomaly detection process functional group 370 included in gateway 300 and in that gateway 300b further includes outward communicator 390. Note that these structural elements, which are also functional structural elements, are implemented by reading and executing, by the processing unit, a program held in the storage, holding predetermined data in the storage, or transmitting/receiving data via the input/output unit, or by a combination of these operations, in gateway 300b.

Anomaly detection process functional group 370b communicates with server 500 and determines, in conjunction with server 500, whether the received message is anomalous. Details of elements included in anomaly detection process functional group 370b will be described later.

Outward communicator 390 communicates with server 500.

[2.3 Configuration of Anomaly Detection Process Functional Group]

Figure 14:
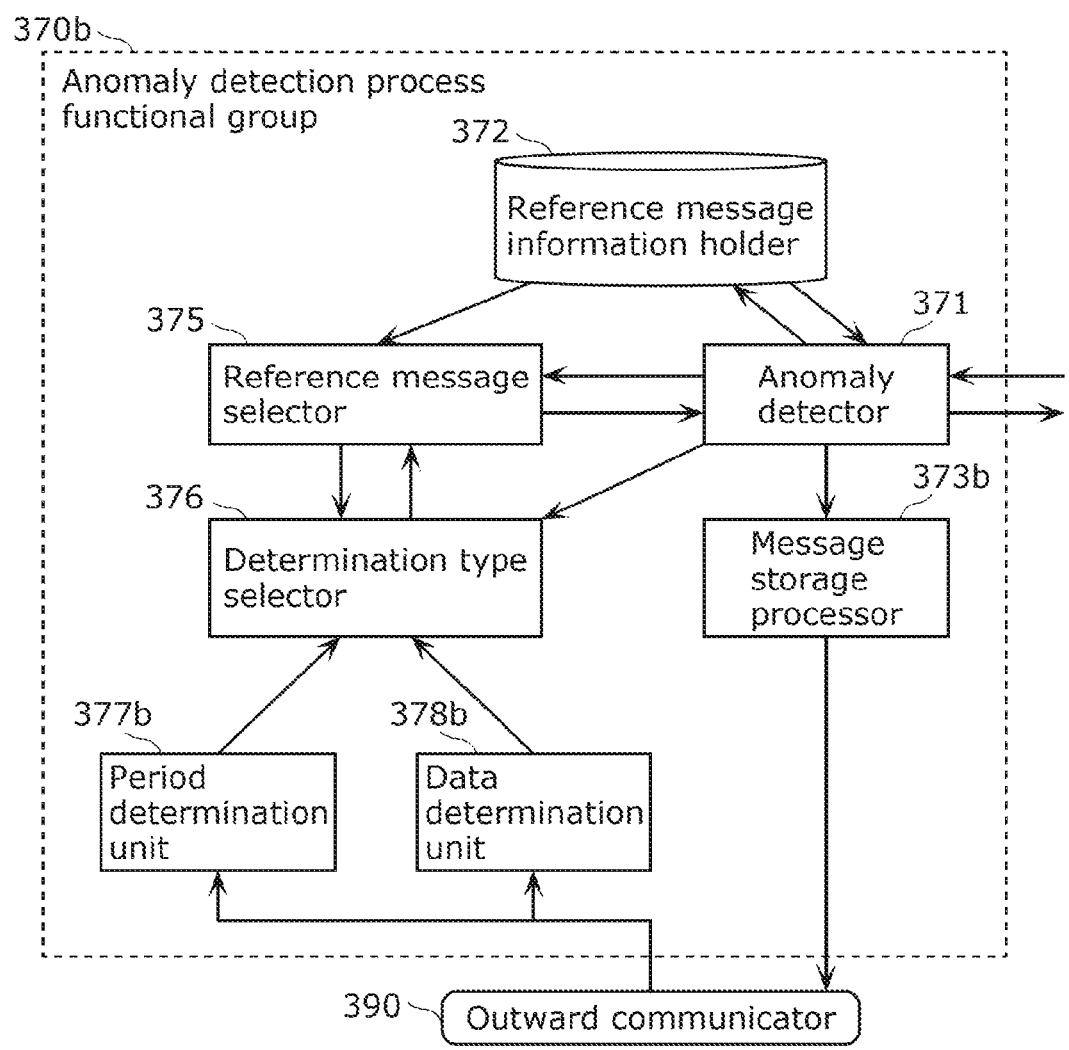
FIG. 14 is a block diagram illustrating one example of the functional configuration of an anomaly detection process functional group according to Embodiment 2.

FIG. 14 is a block diagram illustrating one example of the functional configuration of anomaly detection process functional group 370b according to the present embodiment. In FIG. 14, the same structural elements as those illustrated in FIG. 6 are indicated by the same reference signs, and description thereof will be omitted.

Anomaly detection process functional group 370b includes anomaly detector 371, message storage processor 373b, period determination unit 377b, and data determination unit 378b.

When message storage processor 373b determines the received message as being normal and being required to be stored in response to the result of the determination performed by anomaly detector 371, message storage processor 373b communicates with server 500 via outward communicator 390, transmits information regarding the normal message to server 500, and causes server 500 to store the information regarding the normal message. Determination on whether the message needs to be stored is substantially the same as that in Embodiment 1.

Period determination unit 377b and data determination unit 378b determine a message among the plurality of reference message candidates as the reference message in response to the determination request received from determination type selector 376. At the time of performing this determination, period determination unit 377b and data determination unit 378b communicate with server 500 via outward communicator 390, receive the predictive model generated at server 500, and calculate a predicted value using the received predictive model.

Note that in the generation of the predictive model at server 500, a model of the information regarding the normal message may be obtained using methods such as machine learning, statistical processing, and probability theory, and said model may be provided as the predictive model. Furthermore, server 500 may perform the operation from the generation of the predictive model to the calculation of the predicted value in response to the request from period determination unit 377b and data determination unit 378b so that period determination unit 377b and data determination unit 378b perform only the process of determining a message as the reference message from the predicted value.

Note that the allocation of processing between anomaly detection processing functional group 370b and server 500 is not limited to the above-described example and may be selected as appropriate.

[2.4 Configuration of Server]

Figure 15:
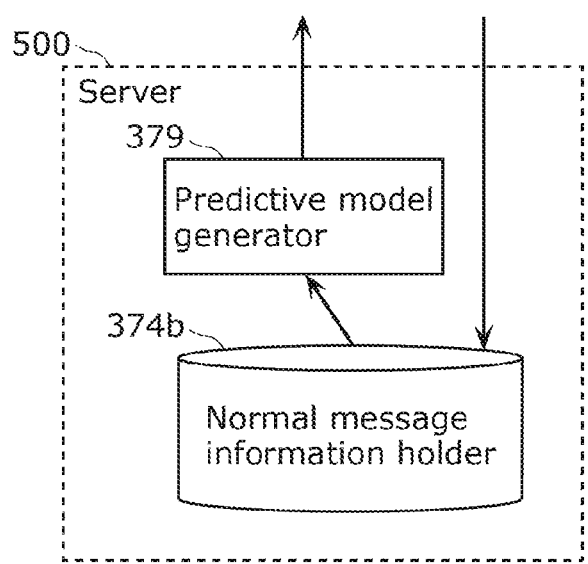
FIG. 15 is a block diagram illustrating one example of the functional configuration of a server according to Embodiment 2.

FIG. 15 is a block diagram illustrating one example of the functional configuration of server 500 according to the present embodiment. Server 500 includes normal message information holder 374b and predictive model generator 379. These structural elements are functional structural elements; server 500, which is what is called a server computer, is provided as at least one computer including, for example, an information processing device such as a processor, a storage device such as a semiconductor memory, and an input/output unit including an input/output port. The above functional structural elements are implemented by reading and executing, by the processing unit, a program held in the storage, holding predetermined data in the storage, or transmitting/receiving data via the input/output unit, or by a combination of these operations.

Normal message information holder 374*b* holds the information regarding the normal message to be stored according to an instruction from message storage processor 373 of gateway 300*b*. Furthermore, the held information regarding the normal message is output in response to a request from predictive model generator 379.

Predictive model generator 379 obtains the information regarding the normal message from normal message information holder 374*b*, and predicts at least one of the expected receipt time and the data value from the previously received normal message. At this time, the expected receipt time may be predicted using only the receipt time information or may be predicted using the data value in addition to the receipt time information. Furthermore, the expected receipt time may be predicted using only messages with the same ID or may be predicted using messages with different IDs in addition to the messages with the same ID. As a specific prediction method, a model (network) such as an auto-regressive (AR) model, an auto-regressive moving average (ARMA) model, a hidden Markov model (HMM), a Bayesian model, a support vector machine (SVM) model, a neural network model, and a deep learning model may be generated from the information regarding the normal message using machine learning, statistical processing, or probability theory, and a predicted value related to the expected receipt time or the expected data value of a message to be received may be calculated using said model. Furthermore, a prediction method not indicated hereinabove may also be used for the prediction.

Furthermore, predictive model generator 379 transmits the predictive model in response to a request from period determination unit 377*b* or data determination unit 378*b* of gateway 300*b*.

Note that server 500 may communicate with more than one vehicle 1 and be assigned some of the functions of the anomaly detection process functional group in each vehicle 1. In this case, server 500 may include normal message information holder 374*b* and predictive model generator 379 that are unique to each vehicle 1, or may include one set of normal message information holder 374*b* and predictive model generator 379 for two or more vehicles 1 with which server 500 communicates. Furthermore, server 500 may include one set of normal message information holder 374*b* and predictive model generator 379 for some of two or more vehicles 1 with which server 500 communicates. When the one set is included for two or more vehicles 1, normal message information holder 374*b* holds, together with information for identifying each vehicle 1, the information regarding the normal message that has been obtained from said vehicle 1.

Predictive model generator 379 may generate a unique predictive model from the information received from each vehicle 1 and transmit the unique model to said vehicle 1, or may generate a predictive model using integrated information received from vehicles 1 and transmit said model to each vehicle 1.

Here, a method for integrating information received from vehicles 1 may be integrating information received from all vehicles 1 or may be integrating information for each manufacturer, each vehicle type, each model, or each grade of vehicles 1, for example. Alternatively, the information may be integrated for each vehicle class (size, engine displacement, etc.) of vehicles 1, each location of vehicles 1, or each function (for example, self-driving function, driving assistance function, communication function, etc.) of vehicles 1. Alternatively, the information may be integrated for each type or version of firmware or software to be executed by ECU 100, etc., in vehicles 1. These integration methods may be combined.

[2.5 Advantageous Effects]

In the present embodiment, gateway 300*b* and server 500 external to vehicle 1 communicate with each other, and server 500 is assigned some of the functions of anomaly detection process functional group 370 according to Embodiment 1.

Conventionally, the predictive model is generated from only the information collected by each vehicle 1, meaning that the accuracy of the predictive model is limited. However, in the present embodiment, the information is held in server 500, allowing the predictive model to be generated from the information of more than one vehicle 1. Thus, the predictive model is generated quickly or with improved accuracy on the basis of an increased number of normal messages. Using this predictive model, each vehicle 1 can determine a message as the reference message with improve accuracy. As a result, in-vehicle network system 10*a* has improved safety. Furthermore, since the information regarding the normal message is held in server 500, gateway 300*b* does not need to include a large-capacity information holding device, allowing a reduction in the cost of manufacture and maintenance for each vehicle 1.

[3. Other Variations]

It goes without saying that the present disclosure is not limited to the embodiments described above; forms obtained by various modifications to the embodiments that can be conceived by a person having ordinary skill in the art, and forms configured by combining structural elements in different embodiments, so long as these do not depart from the teachings of the present disclosure, are included in the scope of the present disclosure. For example, the following variation is also included in the present disclosure.

Figure 16:
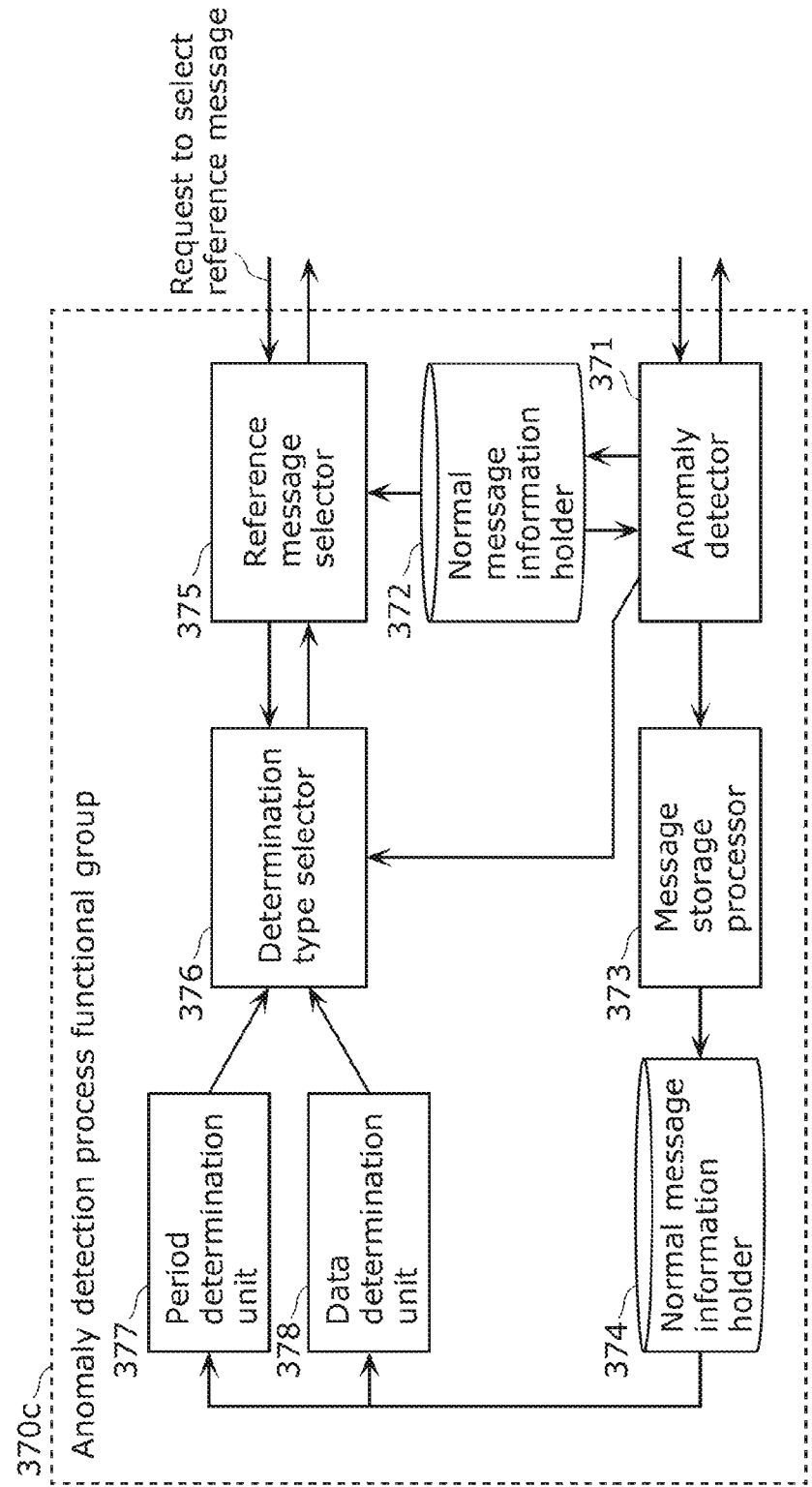
FIG. 16 is a block diagram illustrating the first example of the functional configuration of an anomaly detection process functional group according to another variation.

(1) In the above embodiments, reference message selector 375 of anomaly detection process functional group 370 is requested by anomaly detector 371 to select the reference message, but this is not limiting. FIG. 16 is a block diagram illustrating the first example of the functional configuration of anomaly detection process functional group 370*c* according to another variation. For example, as illustrated in FIG. 16, frame processor 350 may select a timing for selecting a reference message and request reference message selector 375 to select a reference message.

This makes it possible to select a reference message at any time needed.

Figure 17:
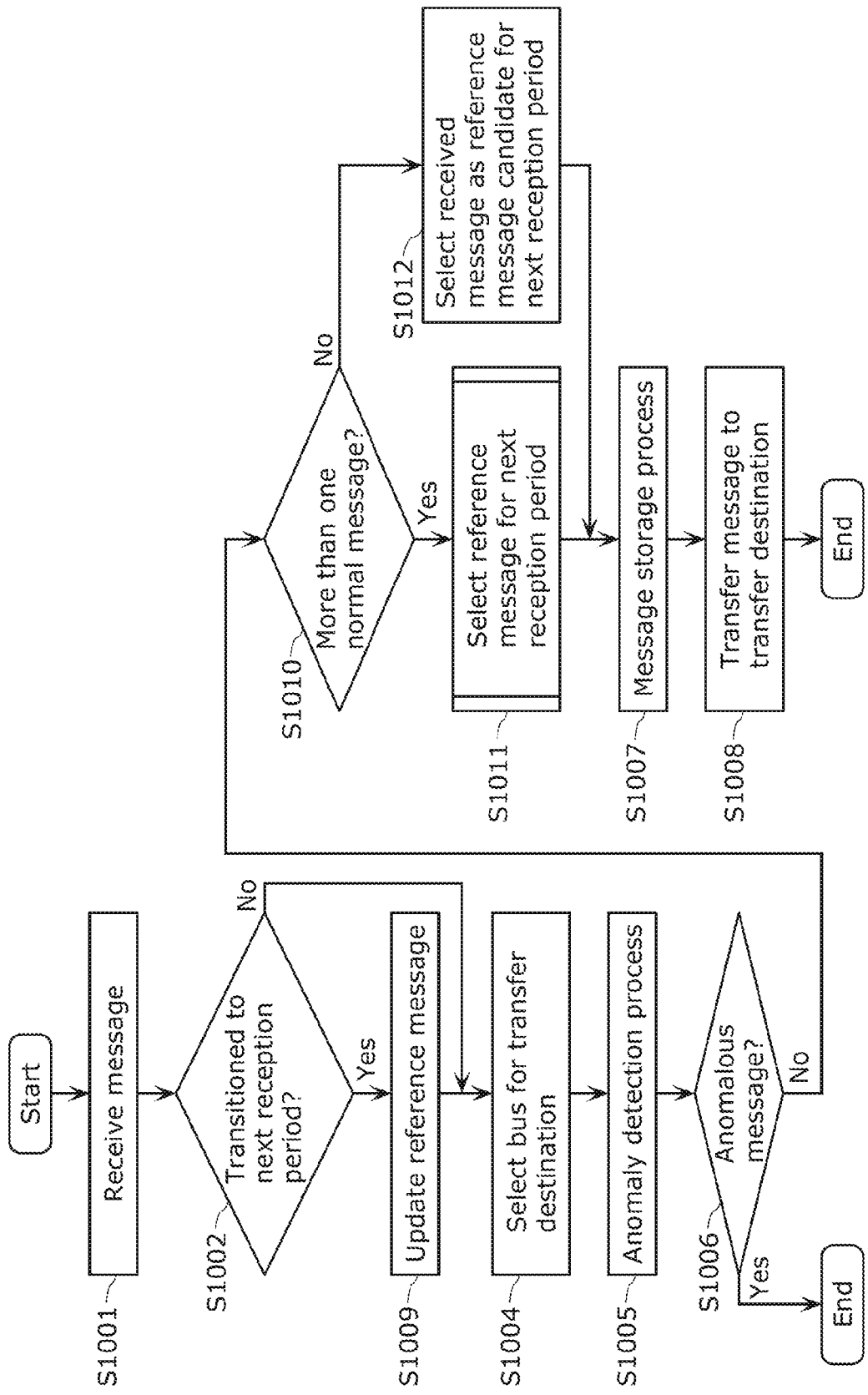
FIG. 17 is a flowchart illustrating one example of an anomaly detection process according to another variation.

(2) In the above embodiments, in the anomaly detection process, when the reception period for messages that are transmitted periodically transitions to the next reception period, a reference message is selected from among the reference message candidates, but this is not limiting. FIG. 17 is a flowchart illustrating one example of an anomaly detection process according to the present variation. For example, as illustrated in FIG. 17, when the received message is selected as being normal (No in Step S1006), anomaly detector 371 determines whether there is more than one normal message within the same reception period (S1010).

When it is determined in Step S1010 that there is more than one normal message (Yes in Step S1010), anomaly detector 371 requests reference message selector 375 to select a reference message for the next reception period, and reference message selector 375 selects a reference message for the next reception period (S1011). This process is the same as the process according to Embodiment 1 in which a reference message is selected (S1003, FIG. 11) and therefore, detailed description thereof will be omitted.

When it is determined in Step S1010 that there is not more than one normal message, that is, the message is the first normal message in the reception period (No in Step S1010), anomaly detector 371 selects, as a reference message candidate for the next reception period, the received message that is normal (S1012).

In this manner, reference message selector 375 of anomaly detection process functional group 370c sets one or more messages determined as being normal in the current reception period to the reference message candidates, and selects a reference message for the next reception period before the next reception period. Steps S1011 and S1012 are one example of the step of selecting the reference message.

The subsequent flow is substantially the same as that in Embodiment 1; anomaly detector 371 stores the normal message into normal message information holder 374 and stores the reference message candidate into reference message information holder 372 (S1007), and frame processor 350 transfers the message to the transfer destination (S1008). Detailed description of these processes will be omitted.

Furthermore, when the reception period for messages that are transmitted periodically transitions to the next reception period (Yes in Step S1002), anomaly detector 371 updates, as a reference message for the new reception period, the only one reference message candidate stored in reference message information holder 372 (S1009).

Thus, there is always one reference message candidate, allowing a reduction in the amount of data to be held in reference message information holder 372. In particular, when anomalous messages are transmitted serially, it is possible to minimize the increase in the amount of data to be stored as the reference message candidates. Furthermore, it is possible to simplify the system because the number of reference message candidates is limited to one, while, in Embodiment 1 in which the number of reference message candidates dynamically changes during operation of the system, it is necessary to provide variable-length storage for the messages of the reference message candidates, or set an upper limit for the reference message candidates in advance and when the number of reference message candidates exceeds the upper limit, replace or discard a reference message candidate.

Figure 18:
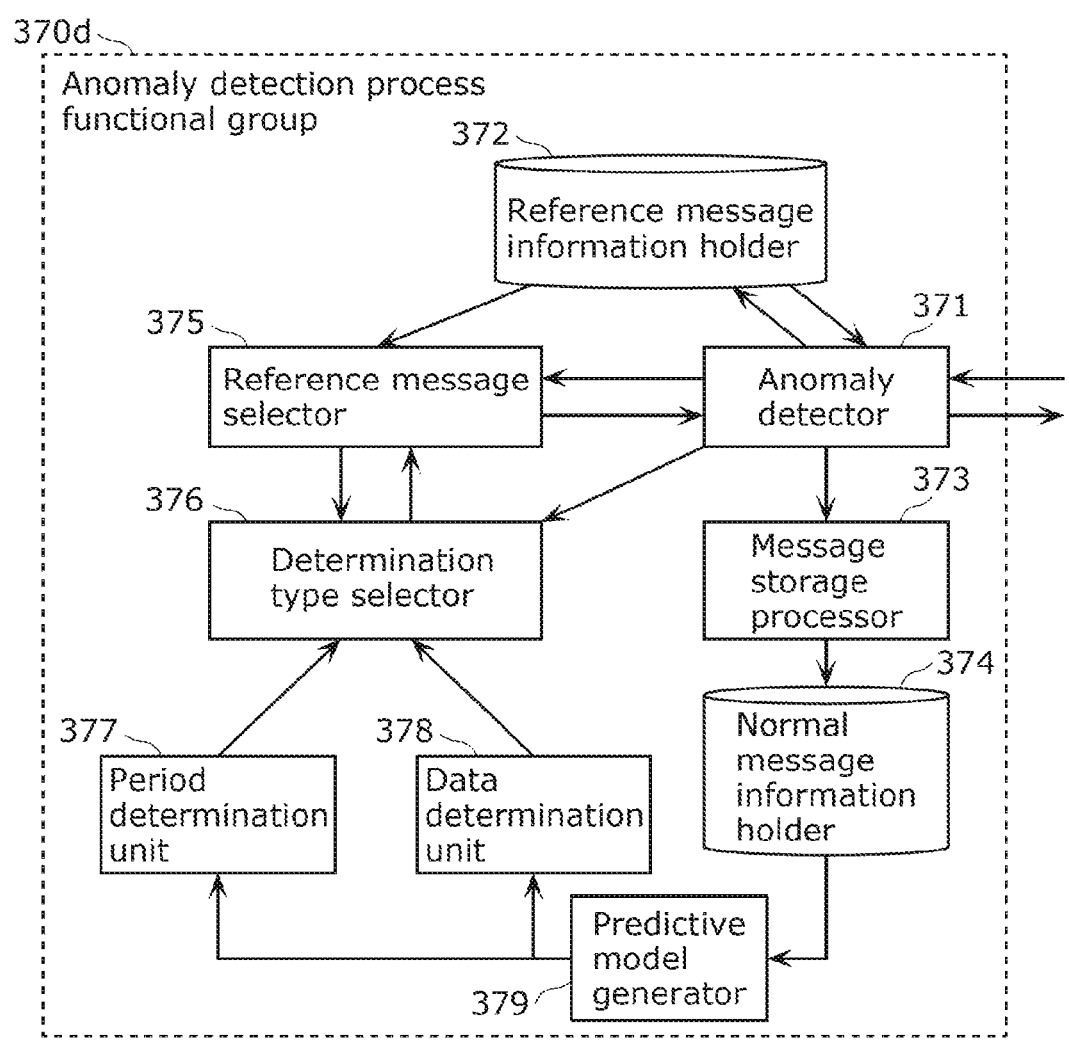
FIG. 18 is a block diagram illustrating the second example of the functional configuration of an anomaly detection process functional group according to another variation.

(3) In the above embodiments, each of period determination unit 377 and data determination unit 378 calculates the predicted value individually, but this is not limiting. FIG. 18 is a block diagram illustrating the second example of the functional configuration of anomaly detection process functional group 370d according to the present variation. For example, as illustrated in FIG. 18, anomaly detection process functional group 370d includes predictive model generator 379; period determination unit 377 and data determination unit 378 may calculate the predicted value using the generated predictive model, or predictive model generator 379 itself may calculate the predictive value using the generated predictive model and report the predicted value to period determination unit 377 and data determination unit 378. Predictive model generator 379 has the functions described in Embodiment 2.

This eliminates the need for both period determination unit 377 and data determination unit 378 to hold the predictive model, allowing the cost of the storage area to be saved and allowing the model generation process, the predicted value calculation process, or the like to be reduced. Furthermore, as a result of the predictive model generation and the prediction using more than one item of information instead of the prediction by period determination unit 377 using only the receipt time or the prediction by data determination unit 378 using only the data value, the prediction accuracy improves, ultimately allowing for improved detection accuracy of anomaly detector 371.

Figure 19:
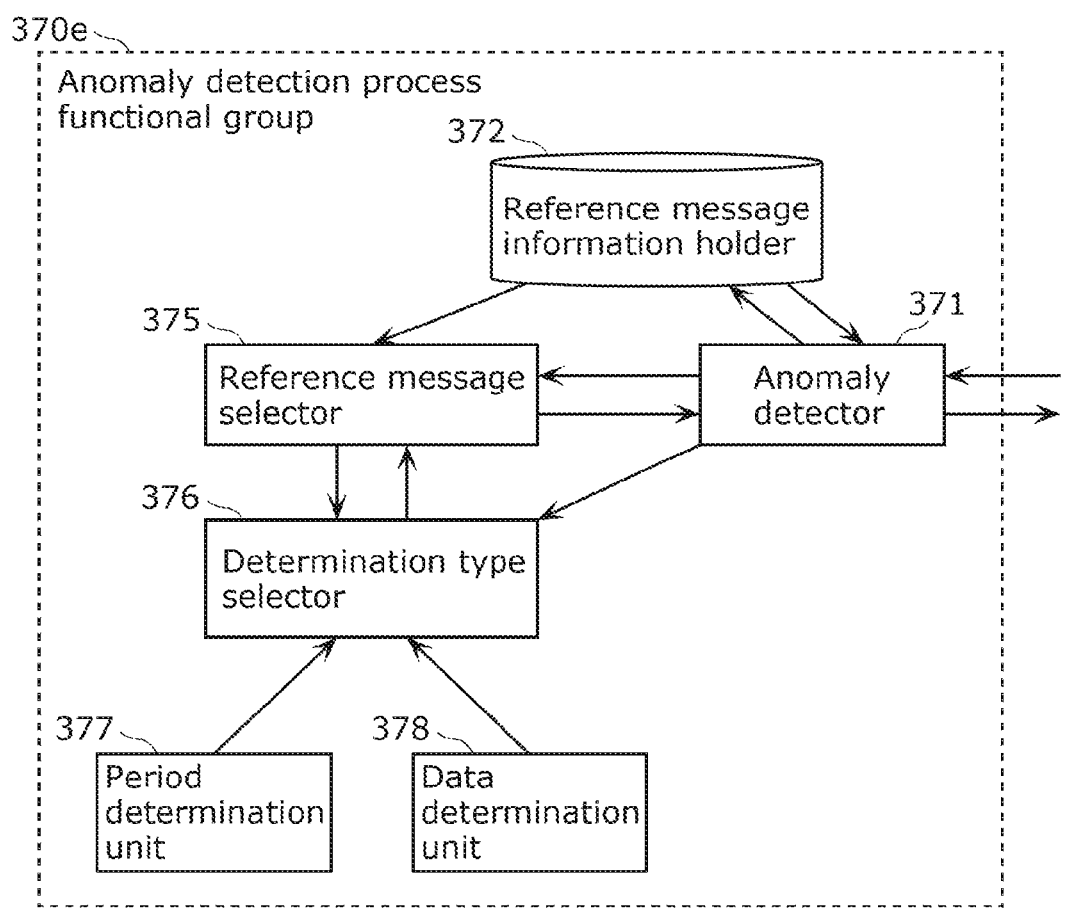
FIG. 19 is a block diagram illustrating the third example of the functional configuration of an anomaly detection process functional group according to another variation.

(4) In the above embodiments, anomaly detection process functional group 370 includes anomaly detector 371, reference message information holder 372, message storage processor 373, normal message information holder 374, reference message selector 375, determination type selector 376, period determination unit 377, and data determination unit 378, but this is not limiting. FIG. 19 is a block diagram illustrating the third example of the functional configuration of anomaly detection process functional group 370e according to the present variation. For example, as illustrated in FIG. 19, anomaly detection process functional group 370e may include anomaly detector 371, reference message information holder 372, reference message selector 375, determination type selector 376, period determination unit 377, and data determination unit 378, and may further include other structural elements. In this case, for example, period determination unit 377 and data determination unit 378 perform the determination process using the reference message held in reference message information holder 372.

(5) In the above embodiments, ECU 100 includes frame transmitter/receiver 110, frame parser 120, receiving ID judgement unit 130, receiving ID list holder 140, frame processor 150, data obtainer 170, and frame generator 180, but this is not limiting.

Figure 20:
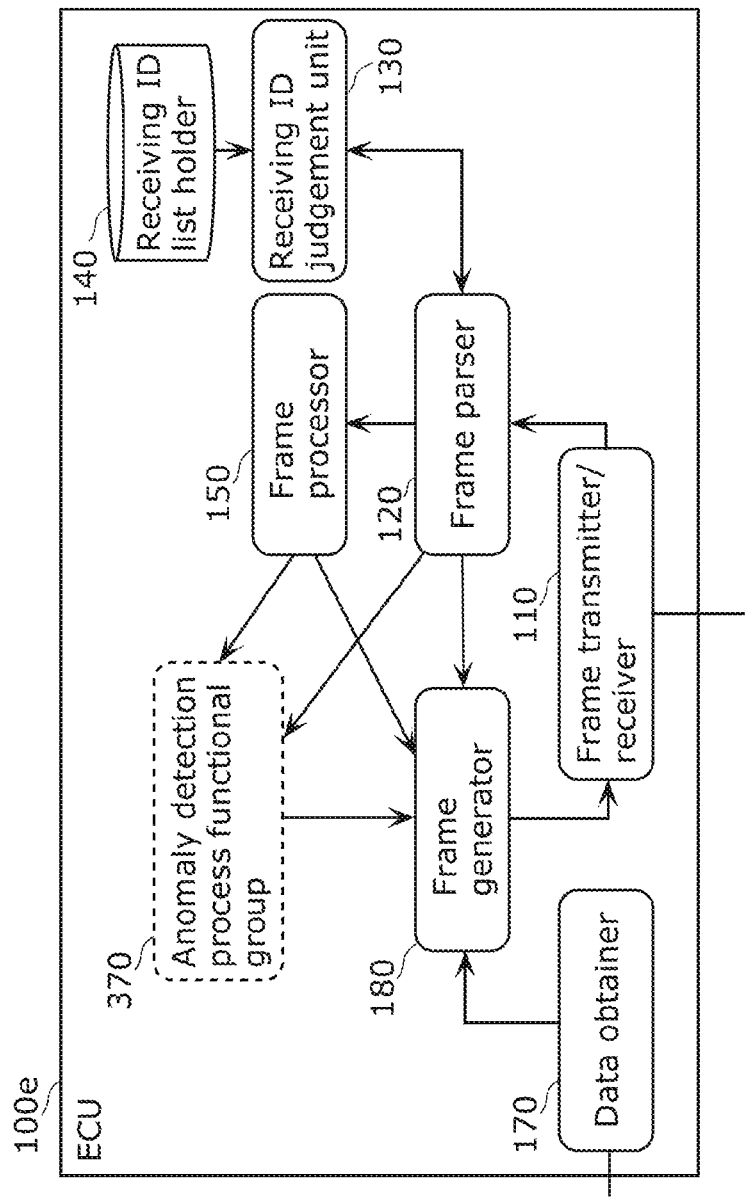
FIG. 20 is a block diagram illustrating the first example of the functional configuration of an ECU according to another variation.

FIG. 20 is a block diagram illustrating the first example of the functional configuration of ECU 100e according to the present variation. For example, as illustrated in FIG. 20, ECU 100e may include anomaly detection process functional group 370. At this time, frame processor 150 may request anomaly detection process functional group 370 to determine whether the message is anomalous, or frame parser 120 may request anomaly detection process functional group 370 to determine whether the message is anomalous. Note that each of the plurality of ECU 100e may include anomaly detection process functional group 370 or at least one ECU 100e may include anomaly detection process functional group 370. In this case, gateway 300 does not need to include anomaly detection process functional group 370.

Figure 21:
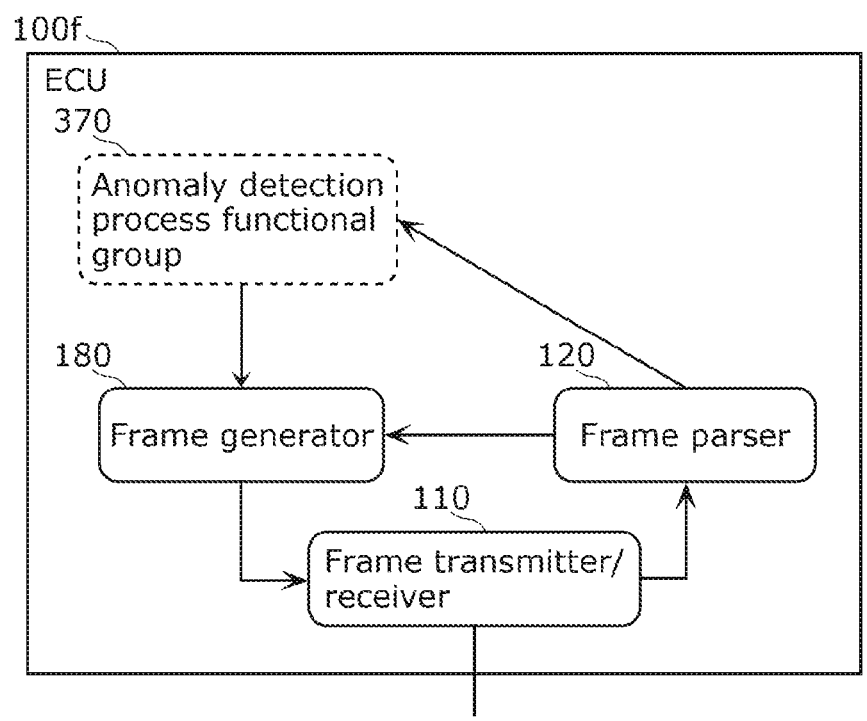
FIG. 21 is a block diagram illustrating the second example of the functional configuration of an ECU according to another variation.

FIG. 21 is a block diagram illustrating the second example of the functional configuration of ECU 100f according to the present variation. For example, as illustrated in FIG. 21, ECU 100f may include frame transmitter/receiver 110, frame parser 120, frame generator 180, and anomaly detection process functional group 370. In this case, frame parser 120 receives all messages and requests anomaly detection process functional group 370 to determine whether the message is anomalous.

Furthermore, ECU 100f may include receiving ID judgement unit 130 and receiving ID list holder 140 in addition to the configuration illustrated in FIG. 21, receive only a message with the message ID indicated in the receiving ID list held by the receiving ID list holder, and request anomaly detection process functional group 370 to determine whether the message is anomalous. Note that the configuration of anomaly detection process functional group 370 may be either the configuration of anomaly detection process functional group 370*a* or the configuration of anomaly detection process functional group 370*b*.

This allows even ECU 100, in addition to gateway 300, to determine whether the message transmitted to bus 200 is anomalous.

Figure 22:
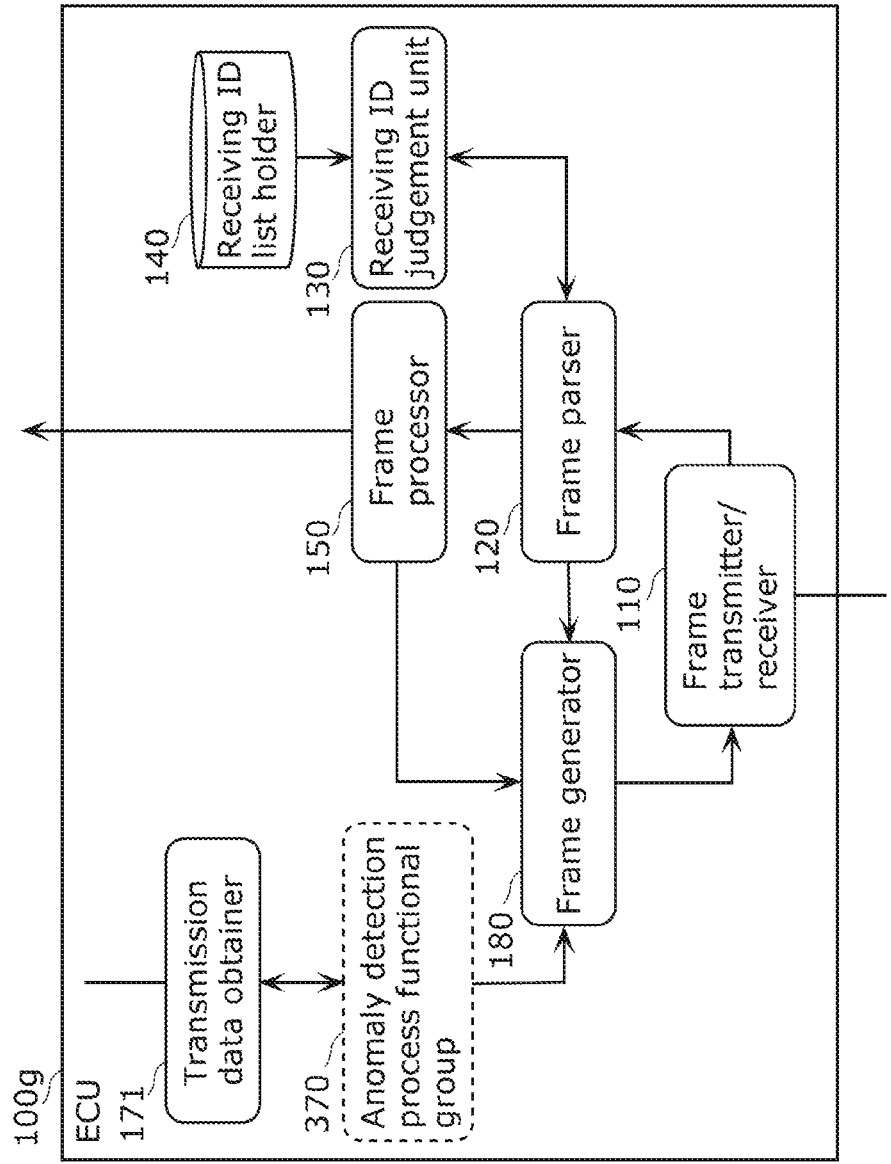
FIG. 22 is a block diagram illustrating the third example of the functional configuration of an ECU according to another variation.

FIG. 22 is a block diagram illustrating the third example of the functional configuration of ECU 100*g* according to the present variation. As illustrated in FIG. 22, ECU 100*g* may further include transmission data obtainer 171 which obtains, from another element, data to be transmitted to bus 200, and anomaly detection process functional group 370 may determine whether the data received from transmission data obtainer 171 is an anomalous message, and only when the data is determined as not an anomalous message, request frame generator 180 to transmit the message.

This can prevent a situation in which an anomalous message is transmitted from a car navigation system or the like to ECU 100*g* that is used together with the car navigation system or the like.

Note that anomaly detection process functional group 370 illustrated in each of FIGS. 20 to 22 may be replaced by one of anomaly detection process functional groups 370*b* to 370*e*.

(6) The above embodiments describe an example in which the action to be taken when an anomaly is detected is avoid transferring the received message, but this is not limiting. For example, gateway 300 may perform the anomaly detection process during the reception of a message to, when the message is determined as being anomalous, invalidate the message being received, by transmission of the error frame.

Thus, other EUCs 100 connected to a network in which an anomalous message is found can be prevented from receiving the anomalous message. This can also apply to a message that is not to be transferred.

Furthermore, gateway 300 may notify a user that an anomaly has occurred, may cause the vehicle to transition to the fail-safe mode, may record in a log the anomaly that has occurred, may notify the server of the anomaly that has occurred through a cell-phone network or the like.

This enables a flexible response after detection of an anomaly. Furthermore, regarding a sequence determined as an anomalous message, the values of data or a set of intervals in which the data is received may be learned as an anomaly label.

Furthermore, ECU 100 may perform the anomaly detection process during the reception of a message to, when the message is determined as being anomalous, invalidate the message being received, by transmission of the error frame. Thus, other EUCs connected to a network in which an anomalous message is found can be prevented from receiving the anomalous message.

(7) The above embodiments describe an example in which the ID is in the standard format, but the ID may be in an extended format.

(8) The above embodiments describe an example in which the message is transmitted in unencrypted form, but the message may be transmitted in encrypted form. Furthermore, the message may include a message authentication code.

(9) The above embodiments describe an example in which the information regarding the normal message and the information regarding the reference message are held without encryption, but these may be encrypted and held or may be stored using a system capable of detecting tampering.

(10) In the above embodiments, the in-vehicle network is cited as an example of a network communication system that performs communication in accordance with o the CAN protocol. The technique according to the present disclosure is not limited to being used in the in-vehicle network, but may be used in a network of robots, industrial devices, etc., or a network communication system, other than the in-vehicle network, that performs communication in accordance with the CAN protocol.

The CAN protocol is used for the in-vehicle network, but this is not limiting. For example, the CAN with flexible data rate (CAN-FD), the FlexRay, the Ethernet, the local interconnect network (LIN), or the media oriented systems transport (MOST) may be used. Alternatively, a network obtained by combining these networks as sub-networks may be used.

(11) Each of the devices according to the above embodiments is specifically a computer system configured of a microprocessor, read only memory (ROM), random access memory (RAM), a hard disk unit, a display unit, a keyboard, and a mouse, for example. A computer program is recorded on the RAM or the hard disk unit. Each of the devices achieves its function as a result of the microprocessor operating according to the computer program. Here, the computer program is configured of a combination of command codes indicating instructions to the computer in order to achieve a predetermined function.

(12) Some or all of the structural elements included in each of the devices according to the above embodiments may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is recorded on the RAM. The system LSI achieves its function as a result of the microprocessor operating according to the computer program.

Furthermore, each unit of the structural elements included in each of the devices described above may be individually configured into a single chip, or some or all of the units may be configured into a single chip.

Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(13) Some or all of the structural elements included in each of the devices described above may be implemented as a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(14) The present disclosure may be the above-described methods. Furthermore, the present disclosure may be a computer program for implementing these methods using a computer or may be a digital signal of the computer program.

Furthermore, the present disclosure may be a computer program or a digital signal recorded on a computer-readable recording medium, such as a flexible disk, a hard disk, a compact disc read-only memory (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and a memory. The memory may have the computer program recorded thereon, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(15) The above embodiments and the above variations may be combined with each other.

(16) Furthermore, the separation of the function blocks in the block diagrams is merely an example, and plural function blocks may be implemented as a single function block, a single function block may be separated into plural function blocks, or part of functions of a function block may be transferred to another function block. Moreover, the functions of function blocks having similar functions may be processed, in parallel or by time-division, by a single hardware or software product.

(17) Furthermore, the order of the processes described in the above embodiments is merely an example. The order of the processes may be changed, and the processes may be performed in parallel. A part of the processes does not need to be performed.

(18) Furthermore, a reference message selection system that performs the reference message selection method according to the above embodiments includes one or more processors and storage. The selection system herein may include more than one device or may include one device.

(19) Furthermore, the above embodiments describe an example in which the reference message selection method is used to detect unauthorized communication in the in-vehicle network system, but this is not limiting. The reference message selection method may be used to detect unauthorized communication in an internal (for example, home or building) network system or the like. For example, the reference message selection method may be used to detect unauthorized communication in a network system in which the message transmission timing is predetermined.

Hereinbefore, a technique for selecting a message that is used as a reference for detecting unauthorized communication with the aim of unauthorized control using anomalous messages in an in-vehicle network according to one or more aspects has been described based on the embodiments and the variations thereof. In these embodiments and variations thereof, a message to be used as a reference for detecting unauthorized communication is selected by the gateway or the ECU that is connected to the in-vehicle network system to perform communication, or a combination of these and a server computer. A system that includes one or more processors and storage and performs such processing for detecting unauthorized communication is referred to as an unauthorized communication detection reference selection system in the present disclosure. Therefore, the unauthorized communication detection reference selection system includes not only one device such as one gateway connected to the in-vehicle network system, but also two or more devices such as a combination of the gateway and the ECU and a combination of the gateway or the ECU and a remotely located server computer.

Furthermore, this technique can be implemented as a method including some or all of steps of processing that is performed by the structural elements in the above embodiments or variations thereof, or a program to be performed by a processor of the unauthorized communication detection reference selection system to allow the unauthorized communication detection reference selection system to perform this method.

Furthermore, processing that is performed by a specific structural element in the above embodiments or variations thereof may be performed by a different structural element instead of the specific structural element. Moreover, the order of the processes may be changed, and the processes may be performed in parallel.

INDUSTRIAL APPLICABILITY

In the selection method, etc., according to the present disclosure, a reference message for detecting an anomaly is selected by selecting a reference message from among reference message candidates using the result of determination by a determination method that allows determination with a high degree of clearness among the results of determination by a plurality of determination methods. Thus, even messages that are conventionally used to be difficult to distinguish between being normal and being anomalous can be accurately identified as being normal, and network protection is ensured.

The invention claimed is:

1. A selection method for selecting a reference message to be used to detect unauthorized communication in an in-vehicle network system including a network and one or more electronic control units connected to the network, the reference message being used as a reference for determining whether a message sent to the network is anomalous, the selection method comprising:

storing candidate information of one or more reference message candidates of the reference message;

first selecting, based on the candidate information of the one or more reference message candidates stored in the storing operation, a rule for selecting the reference message from among a plurality of rules; and second selecting the reference message from among the one or more reference message candidates using the rule selected in the first selecting operation, wherein the first selecting operation includes calculating a degree of appropriateness for each of the plurality of rules, and selecting, based on the degree of appropriateness calculated for each of the plurality of rules, the rule for selecting the reference message, the degree of appropriateness indicating a level of appropriateness of selecting the reference message from among the one or more reference message candidates.

2. The selection method according to claim 1, wherein the first selecting operation includes selecting, as the rule for selecting the reference message from among the one or more reference message candidates, a rule that is highest in the degree of appropriateness among the plurality of rules.

3. The selection method according to claim 2, wherein the degree of appropriateness is a second difference that indicates a difference between at least two first differences, and each of the at least two first differences indicates a difference between a predicted value for the message sent to the network and a value indicated in one of the one or more reference message candidates.

4. The selection method according to claim 3, wherein the first selecting operation includes extracting two values from among three or more values indicated by three or more reference message candidates when the one or more reference message candidates include three or more reference message candidates, and the at least two first differences are differences between the predicted value and each of the two values extracted.

5. The selection method according to claim 3, wherein the predicted value is calculated based on a value indicated in a reference message that has been previously selected.

6. The selection method according to claim 3, wherein the predicted value is obtained by inputting, to a predictive model created in advance, a value indicated in one of the one or more reference message candidates that have a same message identifier indicating the type of data included in the message.

7. The selection method according to claim 1, wherein the plurality of rules includes at least one of:
 a period determination rule for selecting the reference message based on a period of time in which the message is sent to the network; and
 a data determination rule for selecting the reference message based on a value of data included in the message sent to the network.

8. The selection method according to claim 1, further comprising:
 determining whether the message sent to the network is anomalous, wherein
 the one or more reference message candidates include the message determined as being anomalous in the determining operation, and
 the second selecting operation includes selecting, as the reference message, a message different from the message determined as being anomalous among the one or more reference message candidates.

9. The selection method according to claim 1, further comprising:
 determining whether the message sent to the network is anomalous, wherein
 the second selecting operation includes selecting one or more messages determined as being normal in a current reception period as the one or more reference message candidates that are used in a next reception period, before the next reception period.

10. A non-transitory computer-readable recording medium having recorded thereon a program for causing a computer to execute the selection method according to claim 1.

11. A selection system for selecting a reference message to be used to detect unauthorized communication in an in-vehicle network system including a network and one or more electronic control units connected to the network, the selection system comprising:
 one or more hardware processors; and
 storage, wherein
 the reference message is used as a reference for determining whether a message sent to the network is anomalous, and
 the one or more hardware processors perform the following operations using the storage:
  storing candidate information of one or more reference message candidates of the reference message;
  first, selecting, based on the candidate information of the one or more stored reference message candidates, a rule for selecting the reference message from among a plurality of rules; and
  second, selecting the reference message from among the one or more reference message candidates using the rule selected, wherein the first selecting operation includes
   calculating a degree of appropriateness for each of the plurality of rules, and
   selecting, based on the degree of appropriateness calculated for each of the plurality of rules, the rule for selecting the reference message, the degree of appropriateness indicating a level of appropriateness of selecting the reference message from among the one or more reference message candidates.

* * * * *